US012579284B2

(12) United States Patent
Lally et al.

(10) Patent No.: US 12,579,284 B2
(45) Date of Patent: Mar. 17, 2026

(54) TRACEABLE DECENTRALIZED CONTROL OF NETWORK ACCESS TO PRIVATE INFORMATION

(71) Applicant: DOGWOOD LOGIC, INC., Blacksburg, VA (US)

(72) Inventors: Evan M. Lally, Blacksburg, VA (US); Sandra M. Klute, Blacksburg, VA (US)

(73) Assignee: DOGWOOD LOGIC, INC., Blacksburg, VA (US)

( * ) Notice: Subject to any disclaimer, the term of this patent is extended or adjusted under 35 U.S.C. 154(b) by 451 days.

(21) Appl. No.: 18/012,043

(22) PCT Filed: Jul. 2, 2021

(86) PCT No.: PCT/US2021/040283

§ 371 (c)(1),
(2) Date: Dec. 21, 2022

(87) PCT Pub. No.: WO2022/010775

PCT Pub. Date: Jan. 13, 2022

(65) Prior Publication Data

US 2023/0315872 A1 Oct. 5, 2023

Related U.S. Application Data

(60) Provisional application No. 63/048,267, filed on Jul. 6, 2020.

(51) Int. Cl.
*G06F 21/60* (2013.01)
*G06F 21/62* (2013.01)
*G06F 21/64* (2013.01)

(52) U.S. Cl.
CPC ........ *G06F 21/604* (2013.01); *G06F 21/6245* (2013.01); *G06F 21/64* (2013.01)

(58) Field of Classification Search
CPC ..... G06F 21/604; G06F 21/6245; G06F 21/64
(Continued)

(56) References Cited

U.S. PATENT DOCUMENTS 9,467,299 B1 * 10/2016 Alexander ............ H04L 9/3247
10,637,666 B1 4/2020 Blankstein
(Continued)

FOREIGN PATENT DOCUMENTS

EP 3 422 221 1/2019

OTHER PUBLICATIONS

Corrected International Preliminary Report on Patentability for PCT/US2021/040283 mailed Feb. 8, 2023, 86 pages.
(Continued)

*Primary Examiner* — Dereena T Cattungal
(74) *Attorney, Agent, or Firm* — NIXON & VANDERHYE P.C.

(57) ABSTRACT

Access by decentralized client computers to private information pertaining to a subject stored in a decentralized database is selectively controlled to facilitate an access-control transaction. The private information is embedded with one or more access-control objects containing an independently-verifiable digital representation of consent by the subject and associated computer instructions to control access to the private information based on consent of the subject. The one or more access-control objects are used to determine whether to selectively authorize access to the private information and then embed with the private information a digital representation of the access-control transaction traceable to the consent of the subject.

27 Claims, 17 Drawing Sheets

(58) Field of Classification Search
USPC .......................................................... 726/27
See application file for complete search history.

(56) References Cited

U.S. PATENT DOCUMENTS

| | | | |
|---|---|---|---|
| 10,719,623 B1 * | 7/2020 | Miller | G06F 21/6227 |
| 11,936,796 B1 * | 3/2024 | Allen | H04L 9/3263 |
| 12,160,522 B2 * | 12/2024 | Sumner | H04L 9/50 |
| 2008/0263644 A1 | 10/2008 | Grinstein | |
| 2010/0043070 A1 | 2/2010 | Okada et al. | |
| 2011/0106769 A1 | 5/2011 | Baptist et al. | |
| 2012/0102566 A1 * | 4/2012 | Vrancken | H04L 63/10 |
| | | | 726/20 |
| 2013/0194301 A1 | 8/2013 | Robbins | |
| 2013/0283362 A1 | 10/2013 | Kress et al. | |
| 2014/0164774 A1 | 6/2014 | Nord et al. | |
| 2017/0318008 A1 | 11/2017 | Mead | |
| 2018/0316502 A1 | 11/2018 | Nadeau | |
| 2019/0312734 A1 | 10/2019 | Wentz | |
| 2019/0371457 A1 | 12/2019 | Paffel | |
| 2019/0372770 A1 * | 12/2019 | Xu | H04L 9/0643 |
| 2020/0005255 A1 | 1/2020 | Wu | |
| 2020/0082061 A1 | 3/2020 | Goldston | |
| 2020/0143300 A1 | 5/2020 | Weldemariam | |
| 2020/0204375 A1 | 6/2020 | Coulmeau | |
| 2020/0327250 A1 | 10/2020 | Wang | |
| 2021/0075623 A1 | 3/2021 | Petersen | |
| 2021/0165898 A1 | 6/2021 | Weiss | |
| 2021/0184844 A1 | 6/2021 | Okano | |
| 2022/0038442 A1 * | 2/2022 | Lev | G06F 21/31 |
| 2022/0345314 A1 | 10/2022 | Doiron | |

OTHER PUBLICATIONS

International Search Report and Written Opinion of the ISA for PCT/US2021/040283, mailed Jan. 6, 2022, 20 pages.
U.S. Appl. No. 17/783,190, filed Jun. 7, 2022, Lally et al.
Notice of Allowance dated Oct. 30, 2025 for U.S. Appl. No. 17/783,190, 24 pages.
Advisory Action dated Aug. 1, 2025 for U.S. Appl. No. 17/783,190, 3 pages.
Final Office Action dated Apr. 28, 2025 for U.S. Appl. No. 17/783,190, 43 pages.
Office Action dated Oct. 11, 2024 for U.S. Appl. No. 17/783,190, 90 pages.
International Preliminary Report on Patentability for PCT/US2020/067472 dated Nov. 24, 2021, 36 pages.
International Search Report for PCT/US2020/067472 dated Mar. 31, 2021, 2 pages.
Written Opinion of the ISA for PCT/US2020/067472 dated Mar. 31, 2021, 8 pages.

* cited by examiner

FIG. 7

Electronic
Decentralized
Ledger

Private Information Profile
Wallet Data Vault

Conditional Consent Credential
ID; Context
Issuer: DID of Home Care Nurse
Claims:
- ID of Private Information Profile (PIP)
- Conditional consent to share information in this PIP:
  - Applies to: Specific type(s) of info in this PIP
  - Condition: VCrequestAndVerify(Requestor, QHP)
  - Condition: VCrequestAndVerify(Requestor, Organization)
  - Condition: VCrequestAndVerify(Requestor, Usage)
    - Condition: ManualApproval(Controller, Usage)
      - Condition: vcVerify(Controller, PIP)
- Consent provided by the subject of this PIP
  - Date: 3/1/2021
  - Expiration: 3/1/2031
  - Type: video recording
  - Event ID & URL to Consent Record Creation Event
Date Issued; Digital Signature of Issuer

Document Create Event
Event ID; Context
Initiator: DID of Home Care Nurse
Anchored Resource
- Record ID
- URL to lookup or request access
- Method to lookup or request access
- Content Hash
- Date Event Posted
Digital Signature of Home Care Nurse Private Information Profile
Health Data Vault

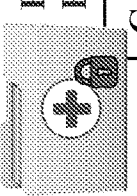

Consent Record
Content ID; Context; PIP ID
Private Metadata
- Type: Video recording
- Recorded By: DID of Home Care Nurse
- (other private metadata)
Private Content
- Video file

- - - →
Information
Referenced
or Embedded
With

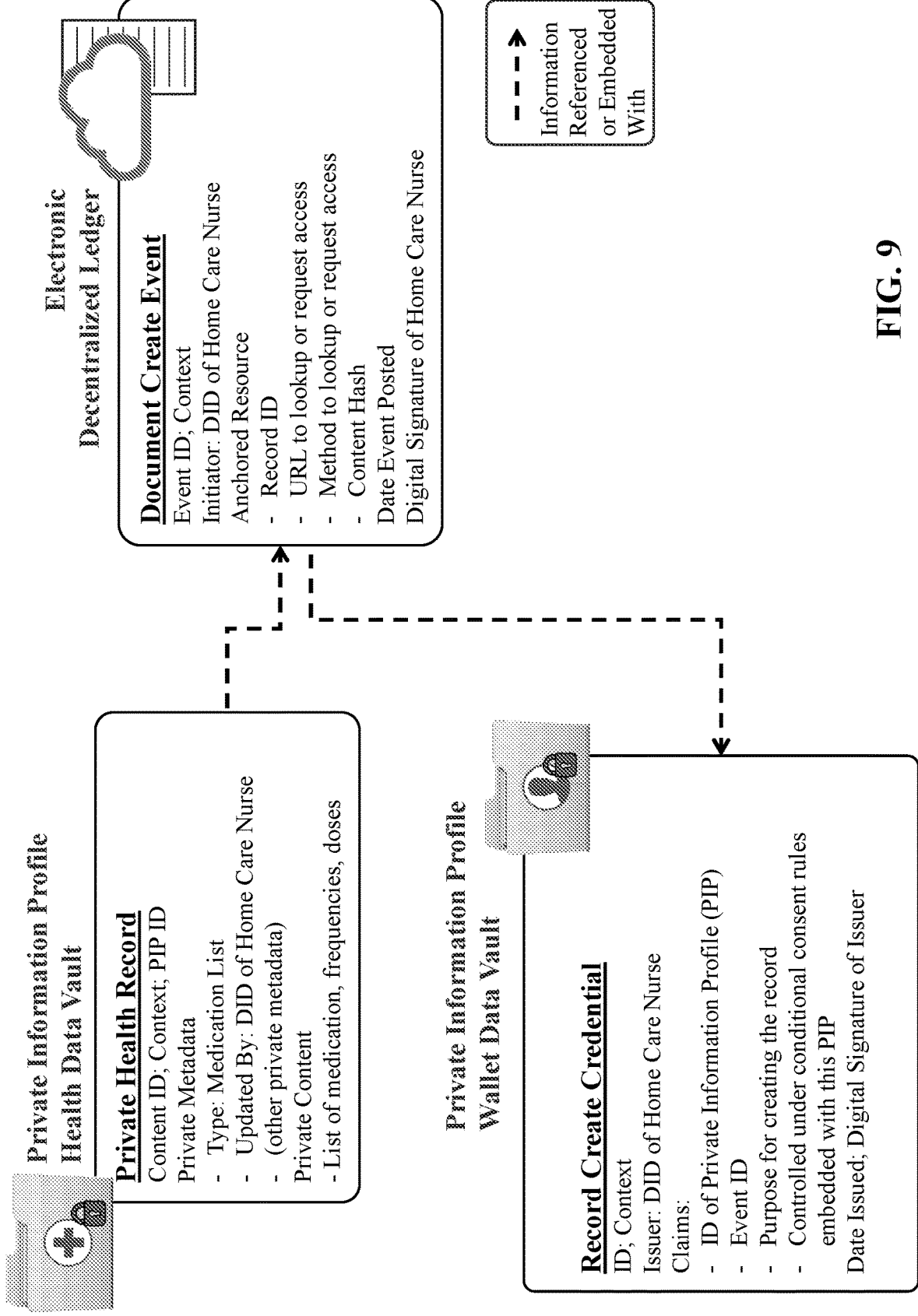

Electronic Decentralized Ledger

Document Create Event
Event ID; Context
Initiator: DID of Home Care Nurse
Anchored Resource
- Record ID
- URL to lookup or request access
- Method to lookup or request access
- Content Hash
- Date Event Posted
Digital Signature of Home Care Nurse

Private Information Profile Health Data Vault

Private Health Record
Content ID; Context; PIP ID
Private Metadata
- Type: Medication List
- Updated By: DID of Home Care Nurse
- (other private metadata)
- Private Content
- List of medication, frequencies, doses

Private Information Profile Wallet Data Vault

Record Create Credential
ID; Context
Issuer: DID of Home Care Nurse
Claims:
- ID of Private Information Profile (PIP)
- Event ID
- Purpose for creating the record
- Controlled under conditional consent rules embedded with this PIP
Date Issued; Digital Signature of Issuer Information Referenced or Embedded With

FIG. 9

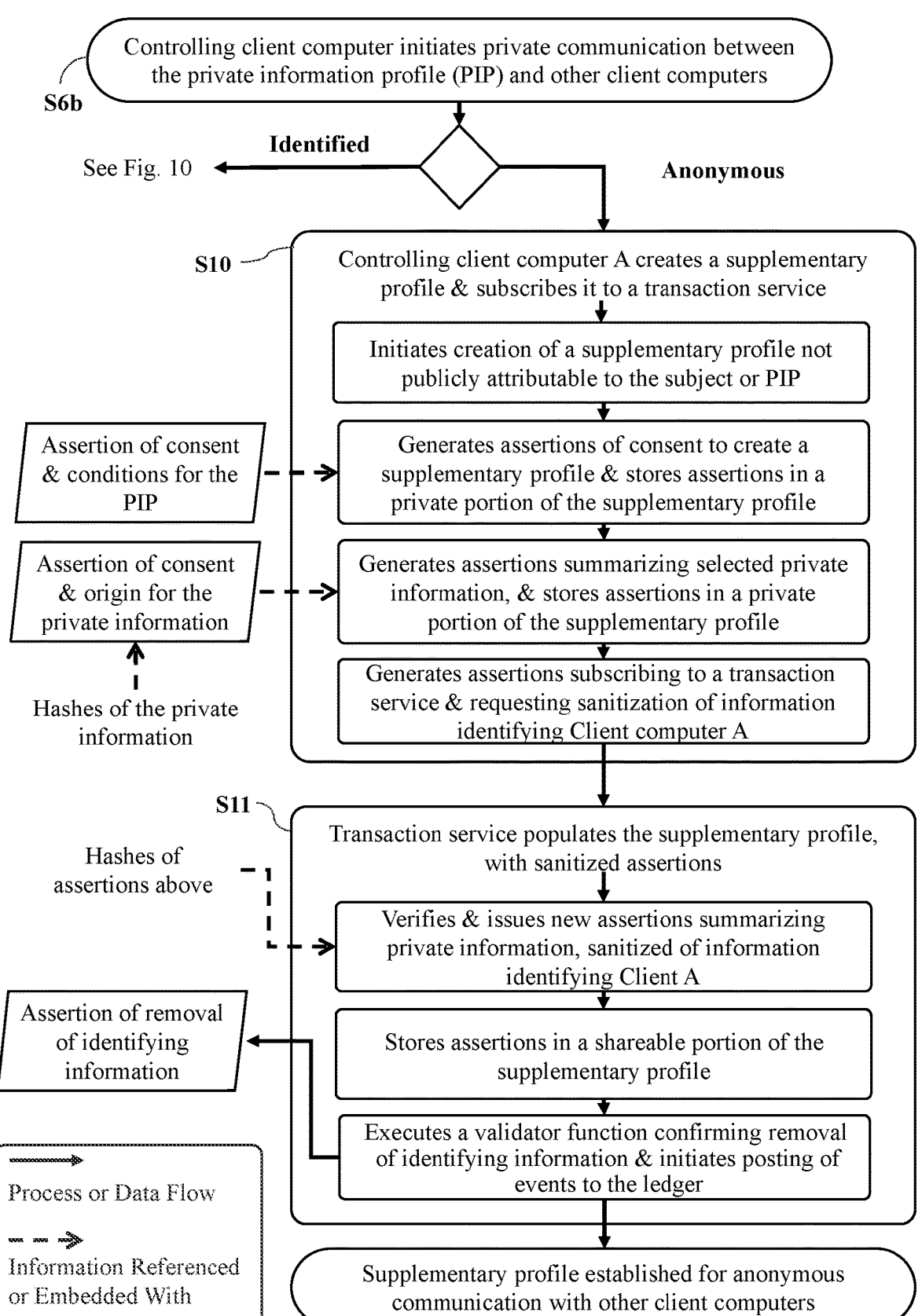

Controlling client computer initiates private communication between the private information profile (PIP) and other client computers S6b See Fig. 10 ← Identified    Anonymous

S10 — Controlling client computer A creates a supplementary profile & subscribes it to a transaction service Initiates creation of a supplementary profile not publicly attributable to the subject or PIP Assertion of consent & conditions for the PIP → Generates assertions of consent to create a supplementary profile & stores assertions in a private portion of the supplementary profile Assertion of consent & origin for the private information → Generates assertions summarizing selected private information, & stores assertions in a private portion of the supplementary profile Hashes of the private information Generates assertions subscribing to a transaction service & requesting sanitization of information identifying Client computer A S11 — Transaction service populates the supplementary profile, with sanitized assertions Hashes of assertions above → Verifies & issues new assertions summarizing private information, sanitized of information identifying Client A Assertion of removal of identifying information ← Stores assertions in a shareable portion of the supplementary profile Executes a validator function confirming removal of identifying information & initiates posting of events to the ledger Process or Data Flow Information Referenced or Embedded With Supplementary profile established for anonymous communication with other client computers

FIG. 11

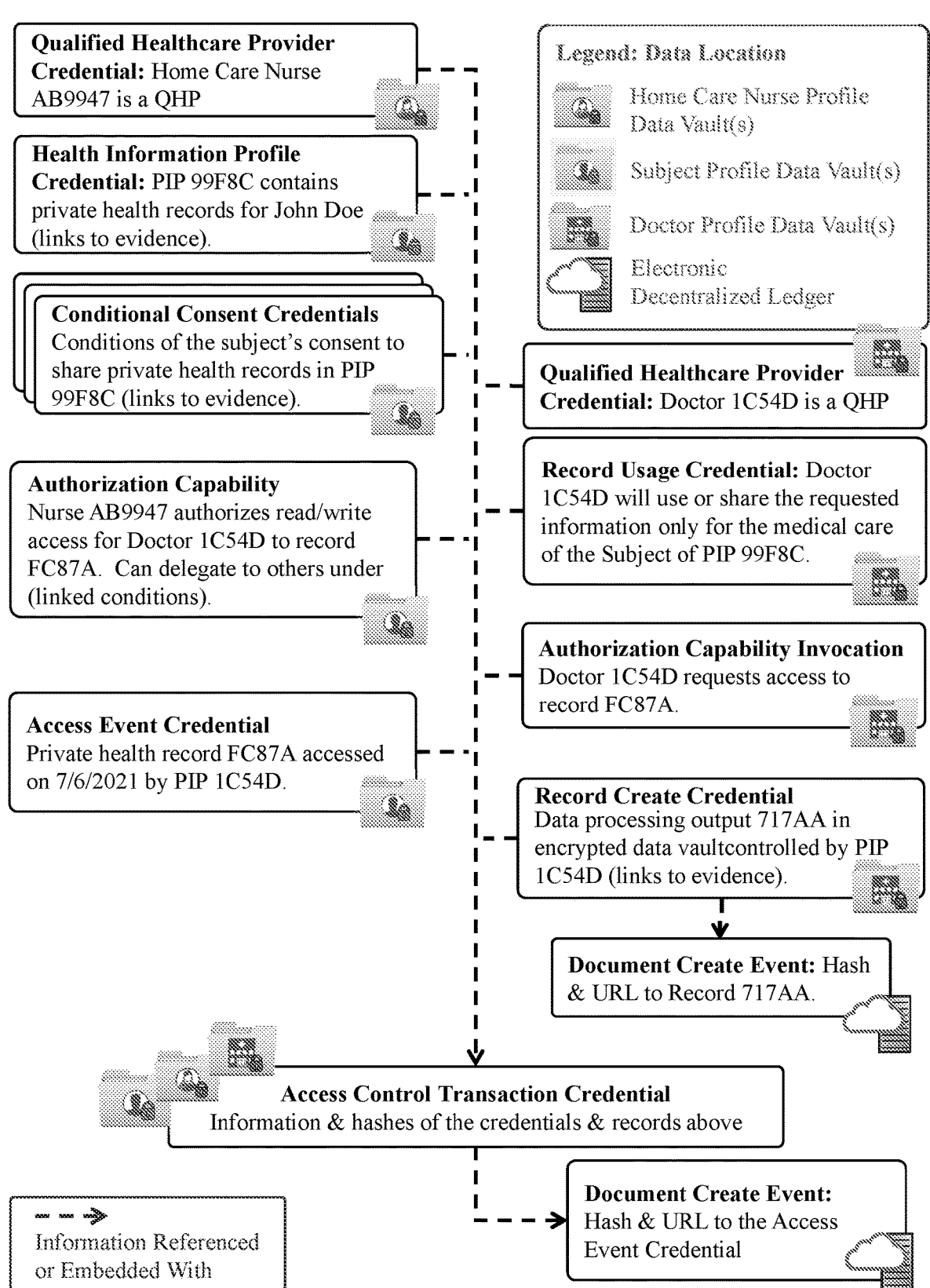

Qualified Healthcare Provider Credential: Home Care Nurse AB9947 is a QHP

Health Information Profile Credential: PIP 99F8C contains private health records for John Doe (links to evidence).

Conditional Consent Credentials Conditions of the subject's consent to share private health records in PIP 99F8C (links to evidence).

Authorization Capability Nurse AB9947 authorizes read/write access for Doctor 1C54D to record FC87A.  Can delegate to others under (linked conditions).

Access Event Credential Private health record FC87A accessed on 7/6/2021 by PIP 1C54D.

Legend: Data Location

Home Care Nurse Profile Data Vault(s)

Subject Profile Data Vault(s)

Doctor Profile Data Vault(s)

Electronic Decentralized Ledger

Qualified Healthcare Provider Credential: Doctor 1C54D is a QHP

Record Usage Credential: Doctor 1C54D will use or share the requested information only for the medical care of the Subject of PIP 99F8C.

Authorization Capability Invocation Doctor 1C54D requests access to record FC87A.

Record Create Credential Data processing output 717AA in encrypted data vaultcontrolled by PIP 1C54D (links to evidence).

Document Create Event: Hash & URL to Record 717AA.

Access Control Transaction Credential Information & hashes of the credentials & records above Information Referenced or Embedded With

Document Create Event: Hash & URL to the Access Event Credential

FIG. 16

TRACEABLE DECENTRALIZED CONTROL OF NETWORK ACCESS TO PRIVATE INFORMATION

This application is the U.S. national phase of International Application No. PCT/US2021/040283 filed Jul. 2, 2021 which designated the U.S. and claims the benefit of U.S. provisional patent application Ser. No. 63/048,267, filed on Jul. 6, 2020, the entire contents of each of which are incorporated herein by reference.

Private information pertaining to a subject person, entity, or group (e.g., personal health information) is often isolated in information systems controlled by other entities, giving little or no control to the subject. For example, health information website portals are managed by an individual healthcare provider, and a patient has access to or control of the information to the extent allowed by the website portal operator. If the patient sees a different provider, they must use a different website portal, or they must request that records be transferred by the provider organizations themselves.

These information systems further lack the ability for the subject of the private information to selectively delegate control to others, in a way that is verifiable and traceable by the subject and the other parties involved using a secure computer-based mechanism. For example, a patient may require a home healthcare nurse to act on his or her behalf in scheduling appointments and storing and managing access to health records. In this example, the patient may or may not have an account with the ability to directly communicate via the information system his/her consent to be treated or share information.

These technical problems are fundamental to centralized computer information systems which lack the ability to granularly define, digitally communicate and electronically verify consent. Conventional electronic decentralized ledger technologies (e.g. blockchain) do not address these problems because they lack an interoperating mechanism for sensitive information storage, access control, and linking of information stored off-chain, under decentralized control and embedded with private, verifiable proof of consent.

What is needed is technology that can establish a verifiable digital record of the consent of the subject of private information, and based on that consent, control access to, monitor usage of, audit the history of, and/or receive compensation for that private information over the lifetime of the private information as it is controlled by a client computer associated with a delegated agent or passed over a communications network to client computers associated with multiple parties for different uses.

SUMMARY

The systems, methods, and devices of the disclosure each have several aspects, no single one of which is solely responsible for its desirable attributes.

Certain aspects provide an apparatus for conditionally controlling access, across a computer network by decentralized client computers, to private information pertaining to a subject stored in a decentralized database. The apparatus comprises a client computer processor and memory to store instructions that, when executed or initiated by the client computer processor, cause the client computer processor to facilitate an access-control transaction, including: embedding with the private information one or more access-control objects containing an independently-verifiable digital representation of consent by the subject and associated computer instructions to control access to the private information based on consent of the subject; receiving requests for private information and in response to the requests, determining from the one or more access-control objects whether to authorize access to the private information; and selectively granting authorization to access the private information and then embedding with the private information, a digital representation of the access-control transaction traceable to the consent of the subject.

In some examples of the method, apparatuses, and non-transitory computer-readable medium described, the client computer processor and/or the memory include a single computer hardware device or multiple computer hardware devices distributed across the computer network. When the client computer processor and/or the memory include multiple computer hardware devices distributed across the computer network, the instructions are executed by a combination of computer processing services distributed across the multiple computer hardware devices.

In some examples of the method, apparatuses, and non-transitory computer-readable medium described, the decentralized database includes encrypted data vaults, and a portion of the decentralized database allocated to the private information includes one or more of the encrypted data vaults controlled by the client computer processor. Each encrypted data vault has computer processing circuitry to: receive, evaluate, and/or respond to requests for information; encrypt, store in encrypted format, and/or decrypt the private information using cryptographic keys controlled by the client computer processor; embed access-control objects with the private information including verifiable digital assertions of authorization to access the private information; and verify assertions of authorization to access private information made by requesting client computers, where the authorization is traceable to the controlling client computer processor through a digital chain of delegation.

In some examples of the method, apparatuses, and non-transitory computer-readable medium described, the client computer processor derives from digital evidence of consent by the subject, a set of verifiable digital assertions of the consent and/or the conditions of the consent, and embeds with each assertion a cryptographic hash, unique digital identifier, and/or uniform resource locator of the digital evidence.

In some examples of the method, apparatuses, and non-transitory computer-readable medium described, the access-control objects and/or the private information are embedded with event objects on an electronic decentralized ledger, each event object containing an independently-verifiable digital representation of the access control object(s) and/or the private information, and recorded events forming a persistent, traceable digital representation of the access-control transaction.

In some examples of the method, apparatuses, and non-transitory computer-readable medium described, the private information is controllable using a private information profile pertaining to the subject. The private information profile includes: unique digital identifiers pertaining to the subject and/or the private information profile; cryptographic keys and/or computer processing instructions for digitally signing, verifying, encrypting, decrypting, and/or asserting information; client-controlled services for data processing, identity and trust management, conditional access control, encrypted data storage, cryptographic key management, and/or communication with an electronic decentralized ledger; and embedded with the private information profile, the embedded access-control objects representing the consent of the subject to create and/or operate the private information profile.

In some examples of the method, apparatuses, and non-transitory computer-readable medium described, the access-control objects include a verifiable digital assertion of consent of the subject to reveal an identity of the subject to establish a secure relationship with another client computer through which the private information is generated, stored, and/or accessed.

Certain aspects provide an apparatus for requesting access across a computer network by one or more decentralized client computers to private information pertaining to a subject, stored in a decentralized database. The apparatus comprises a requesting client computer processor and memory to store instructions that, when executed or initiated by the client computer processor, cause the requesting client computer processor to facilitate an access-control transaction, including: requesting access to the private information controlled by one of the client computers on the computer network; receiving first access-control objects representing conditions of consent of the subject to access the private information, and in response, transmitting second access-control objects asserting that the requesting client computer processor has fulfilled the conditions; receiving third access-control objects asserting authorization to access and accessing the private information; and receiving fourth access-control objects, embedded with the private information, representing a record of the access control transaction traceable to the consent of the subject.

In some examples of the method, apparatuses, and non-transitory computer-readable medium described, the requesting client computer processor verifies authenticity and/or completeness of the first access-control objects embedded with the private information to determine compliance with consent conditions of the subject.

In some examples of the method, apparatuses, and non-transitory computer-readable medium described, the requesting client computer processor determines from the first access-control objects embedded with the private information a level of trust in authenticity and/or origin of the private information of the subject.

In some examples of the method, apparatuses, and non-transitory computer-readable medium described, the requesting client computer processor requests access to digital evidence embedded with the first access-control objects, access the digital evidence, and display or process the digital evidence to further verify assertions included in the first access-control objects.

In some examples of the method, apparatuses, and non-transitory computer-readable medium described, the requesting client computer processor analyzes the fourth access-control objects embedded with the private information of the subject to verify and/or prove that neither the private information of the subject nor the fourth access-control objects contain information pertaining to and identity of the subject.

In some examples of the method, apparatuses, and non-transitory computer-readable medium described, the requesting client computer processor aggregates operations performed during one or more access-control transactions into a verifiable digital audit report of compliance with the consent conditions of the subject embedded with the private information of the subject.

In some examples of the method, apparatuses, and non-transitory computer-readable medium described, the requesting client computer processor is configured to perform data processing operations on the private information accessed and store a digital output of the data processing operations in an encrypted data vault, where the digital output includes information, reports, numerical or analytical models, and/or digital objects redeemable for goods, services, and/or compensation, where the output of the data processing operations is embedded with fifth access-control objects including cryptographic hashes, unique digital identifiers, and/or uniform resource locators of the fourth access-control objects and/or the output of the data processing; and where the fifth access-control objects form a digital representation of the origin of the output of the data processing operations traceable to the consent of the subject of the private information.

Certain aspects provide a method to facilitate an access-control transaction across a computer network by decentralized client computers to private information pertaining to a subject stored in a decentralized database, comprising: embedding with the private information one or more access-control objects containing an independently-verifiable digital representation of consent of the subject and associated computer instructions to control access to the private information based on consent of the subject; receiving requests for private information and in response to the requests, determining from the one or more access-control objects whether to authorize access to the private information; and selectively granting authorization to access the private information and then embedding with the private information a digital representation of the access-control transaction traceable to the consent of the subject.

Certain aspects provide a method to facilitate an access-control transaction across a computer network by decentralized client computers to private information, including sensitive information pertaining to a subject, stored in a decentralized database, comprising: requesting access to the private information controlled by one of the client computers on the computer network; receiving first access-control objects representing conditions of consent of the subject to access the private information, and in response, transmitting second access-control objects asserting that a requesting client computer processor has fulfilled the conditions; receiving third access-control objects asserting authorization to access and accessing the private information; and receiving fourth access-control objects, embedded with the private information, representing a record of the access control transaction traceable to the consent of the subject.

Certain aspects provide a system for conditionally controlling access, across a computer network by decentralized client computers, to private information pertaining to a subject stored in a decentralized database. The system comprises a client computer processor and memory to store instructions that, when executed or initiated by the client computer processor, cause the client computer processor to facilitate an access-control transaction, including: embedding with the private information one or more access-control objects containing an independently-verifiable digital representation of consent by the subject and associated computer instructions to control access to the private information based on consent of the subject; receiving requests for private information and in response to the requests, determining from the one or more access-control objects whether to authorize access to the private information; selectively granting authorization to access the private information and then embedding with the private information, a digital representation of the access-control transaction traceable to the consent of the subject. The system also comprises a requesting client computer processor and memory to store instructions that, when executed or initiated by the client computer processor, cause the requesting client computer processor to facilitate an access-control transaction, including: requesting access to the private information controlled by one of the client computers on the computer network; receiving first access-control objects representing conditions of consent of the subject to access the private information, and in response, transmitting second access-control objects asserting that the requesting client computer processor has fulfilled the conditions; receiving third access-control objects asserting authorization to access and accessing the private information; receiving fourth access-control objects, embedded with the private information, representing a record of the access control transaction traceable to the subject's consent.

Certain aspects provide a non-transitory computer-readable storage storing computer-executable information, which when executed or initiated by one or more computers, causes the one or more computers to implement the following operations to facilitate an access-control transaction across a computer network by decentralized client computers to private information pertaining to a subject stored in a decentralized database, comprising: embedding with the private information one or more access-control objects containing an independently-verifiable digital representation of consent of the subject and associated computer instructions to control access to the private information based on consent from the subject; receiving requests for private information and in response to the requests, determining from the one or more access-control objects whether to authorize access to the private information; and selectively granting authorization to access the private information and then embedding with the private information a digital representation of the access-control transaction traceable to the consent of the subject.

Certain aspects provide a non-transitory computer-readable storage storing computer-executable information, which when executed or initiated by one or more computers, causes the one or more computers to implement the following operations to facilitate an access-control transaction across a computer network by decentralized client computers to private information pertaining to a subject stored in a decentralized database, comprising: requesting access to the private information controlled by one of the client computers on the computer network; receiving first access-control objects representing conditions of consent of the subject to access the private information, and in response, transmitting second access-control objects asserting that the requesting client computer processor has fulfilled the conditions; receiving third access-control objects asserting authorization to access and accessing the private information; and receiving fourth access-control objects, embedded with the private information, representing a record of the access control transaction traceable to the consent of the subject.

The following description and the drawings set forth in detail certain illustrative features of aspects indicative of but a few of the various ways in which the principles of various aspects may be implemented and/or used.

BRIEF DESCRIPTION OF THE DRAWINGS

FIG. 7 further illustrates examples of access-control objects of FIG. 6 embedded with digital evidence of consent.

FIG. 9 illustrates example access-control objects embedded with the private information as described in step S5 of FIG. 5.

FIG. 11 illustrates an example workflow of step S6*b* of FIG. 5 relating to establishing anonymous communication between a private information profile and a client computer.

FIG. 16 illustrates an example verifiable digital representation of the access-control transaction resulting from the auditing of step S9 of FIG. 5.

DETAILED DESCRIPTION OF EXAMPLE NON-LIMITING EMBODIMENTS

Figure 1:
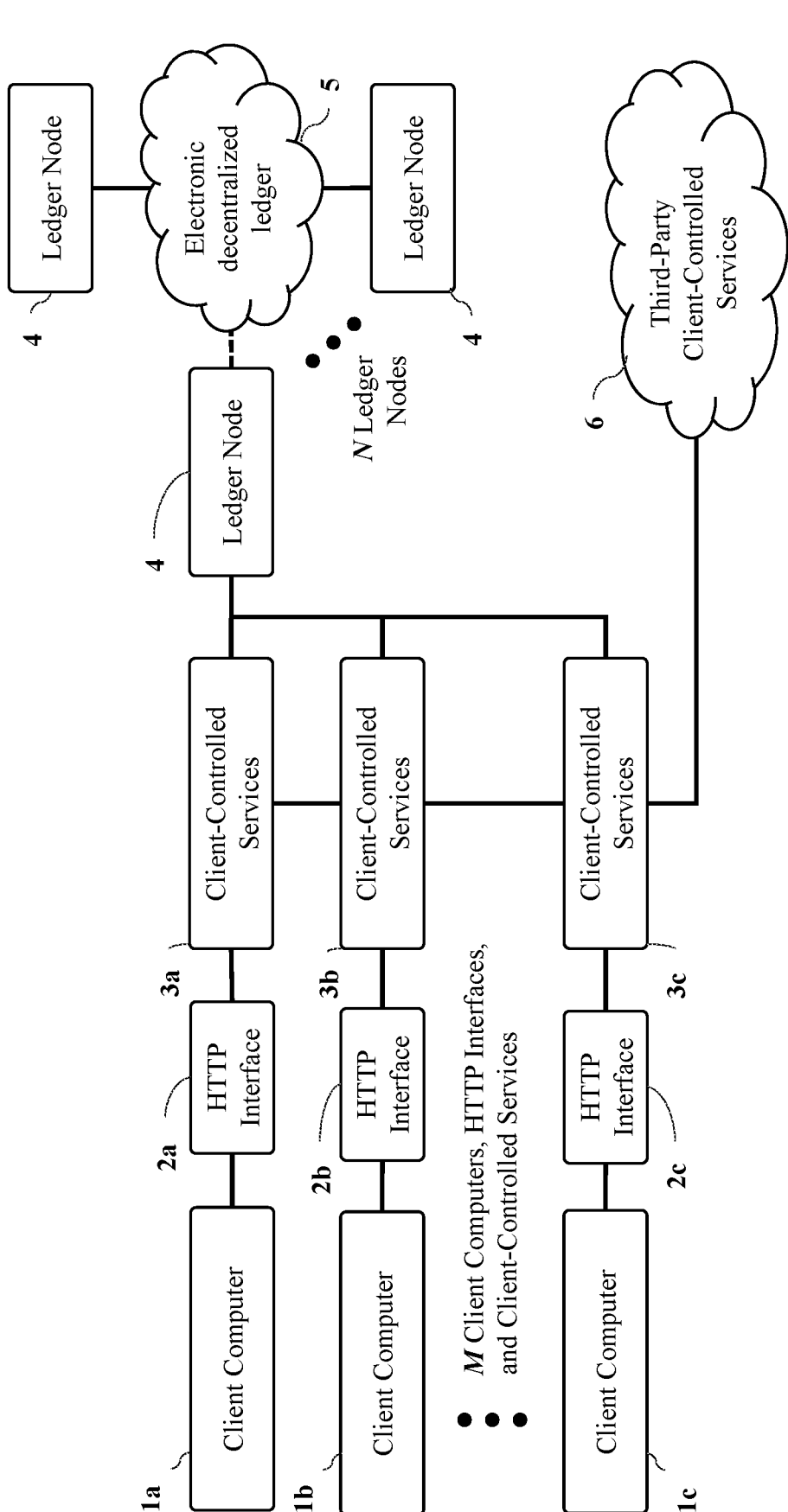
FIG. 1 illustrates an example embodiment of a decentralized database system of private information.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

The technology described in this application deals with private information, which includes sensitive data that pertains to a subject. In the context of this application, a subject encompasses an individual person, a corporate, legal, academic, military, or governmental entity, or groups thereof.

Examples of private information include health records and/or healthcare information pertaining to the subject (e.g., doctor's notes, appointment schedule information, lab test results, diagnoses, genetic, genomic or biometric data, health monitoring, wearable or IoT device data, etc.). Further examples of private information include legal documents pertaining to the subject (e.g., will and testament, marriage license, professional license, court proceedings, patent documentation, etc.), or financial information pertaining to the subject (tax returns, accounting documents, investment portfolio information, etc.). It will be appreciated that there are many other examples of private information.

The subject may or may not own, control, or generally be responsible for the private information. For example, a subject may own and control his/her own date of birth and biometric data, while a doctor's notes pertaining to a subject's medical visit may be owned and controlled by the doctor's medical practice. Both are examples of private information pertaining to a subject.

In some examples, entities controlling and/or accessing the private information are required (e.g., by law, agreement with the subject, professional guidelines, ethical guidelines, etc.) to: (i) obtain and follow the subject's consent (either directly or via a third party delegated by the subject) to access and/or use the information for a specific purpose, (ii) protect and restrict access to the information (based on the conditions of the subject's consent and/or on regulations, guidelines, etc.), and/or (iii) protect the subject's anonymity.

The technology in this application further describes a digital representation of the subject's consent (e.g., approval) to specific actions under specific conditions. Example embodiments include consent to access private information, consent to use private information for specific purposes, consent to delegate control of access to private information under specific conditions, consent to reveal the subject's identity to specific third parties, consent to be notified of specific events, consent for private information to be generated, recorded, or retained, consent to treatment, consent to counsel, etc.

Access to or usage of private information is granted, denied, or revoked by the controller of that information. The controller may or may not be the subject of information. In some examples, the subject has delegated control of private information to another party. In other examples, this delegation is repeated in series to form a chain of delegated control.

This application describes access-control digital objects that include independently-verifiable digital representations and associated computer instructions for processing of a subject's consent and/or conditions of consent, or of a third party's fulfillment of those conditions. Examples of access-control objects include: (i) digital evidence of consent and/or conditions by the subject (e.g. digitized video of the subject verbally expressing conditional consent, a scanned paper document signed by the subject expressing conditional consent, a digitally-signed data object expressing conditional consent, etc.); (ii) verifiable digital assertions of consent and applicable conditions (e.g. a verifiable credential issued by the subject or by a third-party witness summarizing a subset of the conditions of consent described in the digital evidence); (iii) verifiable digital assertions of authorization to access and/or use private information under specified conditions (e.g. a cryptographic authorization capability object proving that the holder was granted access through a chain of delegation to a specific set of private information); (iv)

digital evidence of events or transactions related to access of private information. This digital evidence may be built from a combination of other access control objects and/or traceable representations of those objects (e.g., a set of access-control objects exchanged by client computers to assert conditions of the subject's consent, proof of fulfillment of those conditions, evidence of date and time of access, and/or a digital object containing cryptographic hashes of those access-control objects).

A digital object, as is understood in computer science, can be a variable, a data structure, a function, or a method, and as such, is a value in memory referenced by an identifier. For example, a verifiable credential is a digital object which may be expressed in JavaScript Object Notation (JSON) and which may contain one or more of digital information, a digital signature, and links or references to computer code or data standards which may operate on information in the verifiable credential. An example digital object may have a unique digital identifier (unique ID), a uniform resource locator (URL), a pre-defined data structure, and/or a machine-understandable context specifying the definitions of data elements and/or computer code to process the elements of the data structure. Private information may be stored as a digital object; for example, a medical history document (e.g. in portable document format) may be assigned a unique ID, URL, and metadata describing the PDF file type, file size, file name, creation date, etc. and stored with that unique ID, URL, and metadata.

To embed with a digital object means to connect another digital object to that digital object by either (i) making it an integral part of the digital object, or (ii) making the two digital objects an integral part of another digital object. For example, a client computer may compute the cryptographic hash of Object A and store the hash of Object A inside of Object B along with the unique ID and URL of Object A. In another example, a client computes the cryptographic hashes of Objects A and B and store inside of another Object C those hashes and the unique IDs and URLs of Objects B and C.

FIG. 1 illustrates an example embodiment of a decentralized database system on a computer network in which multiple third-party client computers interact to store, control, access, and monitor private information under decentralized control. In each transaction, a client computer may act: as a providing client computer 1a storing private information by or on behalf of the subject of private information, as a controlling client computer 1b exchanging and verifying traceable access control objects and authorizing, denying, or revoking access to the private information, as a requesting client computer 1c exchanging and verifying traceable access control objects, requesting access to the private information, or various combinations of the three—for different aspects of the transaction.

The methods, apparatus, system, and computer program software described in this application may be implemented using an individual client computer as well as one or more combinations of different client or server computers in various access control transactions. One example of a combination of different computers includes a client computer and one or more server computers in communication with the client computer over a communications network. For example, the client computer may execute a program and access one or more server computers using a web browser, where the browser receives additional program instructions over the communications network for the client computer to execute.

Client computers 1a-1c may interact with the decentralized database network/system through a computer network interface. In an example embodiment, a respective HTTP interface 2a-2c is accessed via web browser and/or application on the client computer 1a-1c. In other example embodiments, this computer network interface may be a remote or local IP network accessed by another communication protocol and/or application programming interface (API). Such interfaces may utilize standard web protocols for authentication, session management, and encryption of data in transit, etc.

Each client computer may utilize a set of client-controlled computer services 3a-3c (hereafter simply "client-controlled services") for processing, storage, communication, and/or controlling access to private information. These client-controlled services may also be utilized for establishing, communicating, and/or verifying digital access-control objects (e.g. digital representations of consent, authorization, identity, and/or events). Each client-controlled service 3a-3c may be provisioned directly by the client computer or by a service provider. Furthermore, each client-controlled service 3a-3c may be independently controlled by the client computer such that third party entities other than the client computer are unable (or have limited ability) to set or modify the configuration of the service, initiate, control, and/or stop the execution of the service, and/or access the data handled by the service.

Each set of client-controlled services may connect to and exchange information with, under the direction of a client computer, other client-controlled services controlled by third party client computers (labeled third-party client-controlled services 6 in FIG. 1).

Each set of client-controlled services may subscribe to one or more ledger nodes 4 (for illustration purposes, FIG. 1 shows the client subscribed to a single ledger node), each ledger node 4 being a service controlled and operated by a single computer, group of computers, or a service provider. In some example embodiments, each ledger node 4 is configured and operated according to a set of policies approved by a subscribing client computer(s). Such policies may relate to network boundary configuration, system monitoring, validation and consensus settings, access control, etc., and the subscribers to a particular ledger node may align within a common trust boundary, e.g., members of a company, a healthcare network, a government organization, or citizens of a nation subscribing to a ledger node operated by or on behalf of that organization or nation.

The multiple inter-connected ledger nodes 4 may execute a set of agreed-upon data communication, validation, and consensus algorithms for maintaining an electronic decentralized ledger 5. The electronic decentralized ledger 5 is a shared, trusted, up-to-date, privacy-preserving, auditable record of events and transactions between client computers, including verifiable digital representations of private information and access-control objects. The decentralized ledger 5 may also serve as privacy-preserving index of information, decentralized identifiers, public cryptographic keys, credential revocation status, contexts and data standards, and/or cryptographic access capabilities in the decentralized database. Some example embodiments may include multiple interoperating decentralized ledgers, each referencing or incorporating information from the other, and each with a similar set of ledger nodes and connected client-controlled services and third-party computers.

The system of client computers may implement a data model in which private information and/or access-control objects may be stored in the decentralized database along with a set of independently defined, yet interoperable metadata. In example embodiments, the data model follows the JavaScript Object Notation for Linked Data (JSON-LD) formalism and may include: a set of machine-understandable contexts and associated schema and/or vocabularies that define the terminology, data structures of the information, and/or computer methods for processing or interpreting the information stored in the decentralized database. JSON-LD or similar self-specified data model(s) allow independent client computers to consume and understand information generated by one another without the need for prior coordination or rigorous pre-defined data formats, and these ad-hoc machine-understandable data model(s) support the evolution of techniques, tools, and data formats used in generating, processing, or controlling access to the private information.

Figure 2:
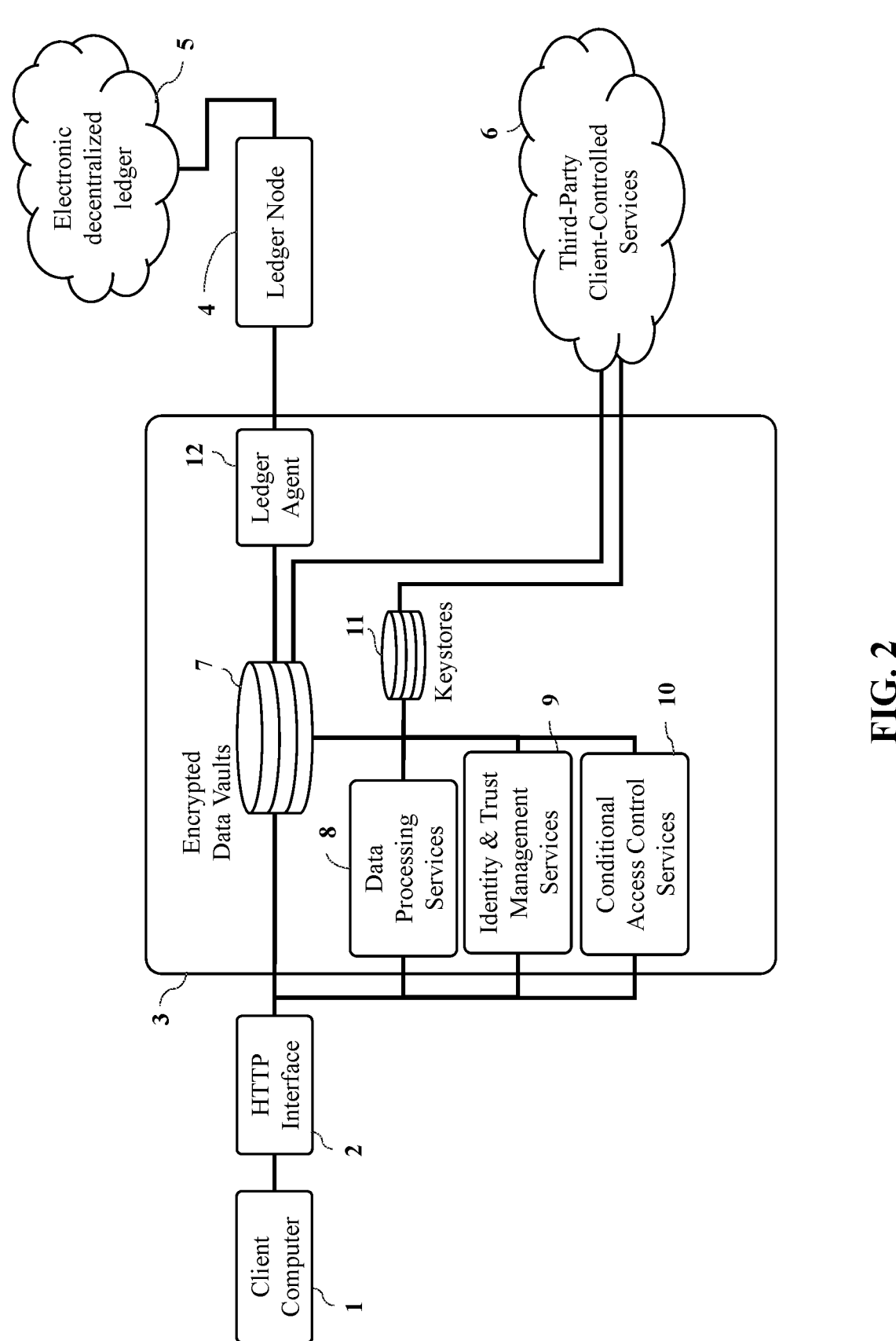
FIG. 2 further illustrates a configuration of components of FIG. 1 from the perspective of an individual client computer.

FIG. 2 illustrates an example embodiment of the decentralized database system in more detail and from the perspective of a client computer 1. (Note that a client computer may act in a providing, controlling, or a requesting capacity while maintaining a similar relationship with the computer services under its control). In this example embodiment, the client-controlled services 3 include a set of encrypted data vaults 7, each of which acts as an independent data server for the client computer.

Each encrypted data vault 7 may store in digital storage media digital objects including private information and/or digital objects related to the control of private information. Each encrypted data vault 7 may assign and manage unique IDs, version information, and an address to access (e.g., Uniform Resource Locator (URL)) for each stored digital object. Each encrypted data vault may further comprise an interface that receives and responds to requests from the client computer and from other third-party client computers to create, modify, or access digital objects stored by the encrypted data vault.

Each encrypted data vault 7 may further comprise an interface through which the providing client computer encrypts private information prior to upload to the encrypted data vault or as an integral part of the information storage process of the encrypted data vault. In an example embodiment, this encryption is performed by the client computer such that the client computer has control of the encryption keys and no third party has access to the encryption keys unless granted by the providing computer.

Each encrypted data vault 7 may further comprise an interface through which the providing client computer cryptographically wraps the secret encryption key such that it can be unwrapped and utilized only by a set of recipients specified by the provider computer. In an example embodiment, this is performed with an asymmetric cryptographic key wrapping algorithm, and the process of encryption and wrapping is performed individually for each digital object so that the providing computer may selectively grant and revoke access to specific digital objects independently.

Each encrypted data vault 7 may further comprise an interface through which the providing client computer generates and issues to specific requesting client computers cryptographic authorization capabilities and through which requesting client computers may assert by cryptographic proof of the capability that they were granted access by the providing computer, under certain terms and conditions, to specific digital objects stored in the encrypted data vault (e.g., private information). Authorization capabilities may include certain additional security measures, defined during issuing by the providing client computer, which must be also meet in order for the requesting client computer to be granted access (e.g. time expiration, one-time use, IP address restrictions, etc.). Interfaces issuing and validating authorization capabilities may be configured to support a network of multiple third-party client computers managing access permissions without reliance on a centrally-maintained access control list, such that the possession of a valid authorization capability and cryptographic proof that it was issued to the requesting computer may be sufficient to invoke the capability and establish authorization to access. Interfaces issuing and validating authorization capabilities may be further configured to accept chains of authorization capabilities where an issuing client computer allows an authorization capability to be delegated by a recipient client computer to one or more levels of additional recipient client computers; and where a delegated capability may be validated by validating multiple nested digital signatures and/or cryptographic hashes.

Encrypted data vaults 7 may be additionally configured to store and control access to different types of private information (e.g., financial information, healthcare information, personal identifying information, legal information, etc.). A client computer may initiate the provisioning of multiple encrypted data vaults under its control such that each encrypted data vault handles certain types of information or is confined to certain types of access requests or classes of requesting client computers/services. Each encrypted data vault 7 may be provisioned with interfaces to connect to external data sources and to request, query receive, format, and/or store streams of data from those external sources.

The client-controlled services 3 may further comprise a set of data processing services 8, which may integrate with the encrypted data vault(s) and may be configured by the client computer to parse, organize, analyze, interpret, translate, transform, and/or sanitize the private information. The data processing services 8 may further be configured to archive, track, audit, and/or make available prior versions of the private information. The data processing services 8 may further be configured to link or associate private information with other information in the decentralized database and/or embed with the private information references to prior versions, related events, or related information.

The client-controlled services 4 may further comprise a set of identity and trust management services 9, which may work with the other client-controlled services to generate and manage decentralized identifiers, private information profiles, public cryptographic keys, and other public and private information representing the digital identities of the subject, client computer, or computer services controlled by the subject or client computer. Events related to the creation and/or update of this information may be posted to the decentralized ledger, and those ledger events may form a privacy-preserving index of decentralized identifiers to which third-party computers may reference access-control objects, requests for private information, and/or private information. The identity and trust management services may further reference such decentralized identifiers to issue, revoke, and verify or validate verifiable digital assertions on behalf of and/or relating to client computers or private information in the decentralized database.

The client-controlled services 3 may further comprise a set of conditional access-control services 10 which may generate, derive, issue, communicate, transmit, receive, verify, and/or embed access-control objects. Conditional access-control services 10 may perform these actions during the storing or accessing of private information, or the generation and/or auditing of a traceable representation of an access-control transaction.

Conditional access-control services 10 may further be configured to derive one or more rulesets (e.g., a decision tree), from a set of access-control objects including assertions of conditions of consent to access private information. These rulesets may provide actionable computer code which when executed allows the conditional access-control services 10 to automatically determine behavior in facilitating an access-control transaction: presenting assertions of access conditions, requesting specific assertions of fulfillment of those conditions, determining which private information is relevant to the request or conditions, and/or determining whether to grant or deny access or notify the user of the client-controlled computer for a manual determination.

Conditional access-control services 10 may further consume machine-understandable metadata, such as JSON-LD contexts and vocabularies to interpret access control objects or to identify computer processing methods for interpreting access-control objects. This machine-understandable metadata may be embedded with the access-control objects by the conditional access-control services 10 during generation of the access-control objects.

The client-controlled services 3 may further comprise a set of keystores 11, in which the client computer may cryptographic keys associated with the decentralized identifiers controlled by the client computer and associated services. Cryptographic keys may be differentiated for a variety of purposes including encryption of private information, digitally signing verifiable assertions, invoking authorization capabilities, updating the decentralized identifier, etc. In some example embodiments, the keystore(s) may be integrated with one or more other client-controlled services; in other example embodiments, one or more keystore(s) may be provided by external service provider(s) and configured to communicate with encrypted data vaults and other services via a defined API.

The client-controlled services 3 may further comprise an electronic ledger agent 12, which may be used by the client computer to generate and submit events to the subscribed ledger node 4 (or to an intermediary transaction service) for posting to the electronic decentralized ledger 5 and to search, fetch, and synthesize the chain of events related to private information from the decentralized ledger 5.

Figure 3:
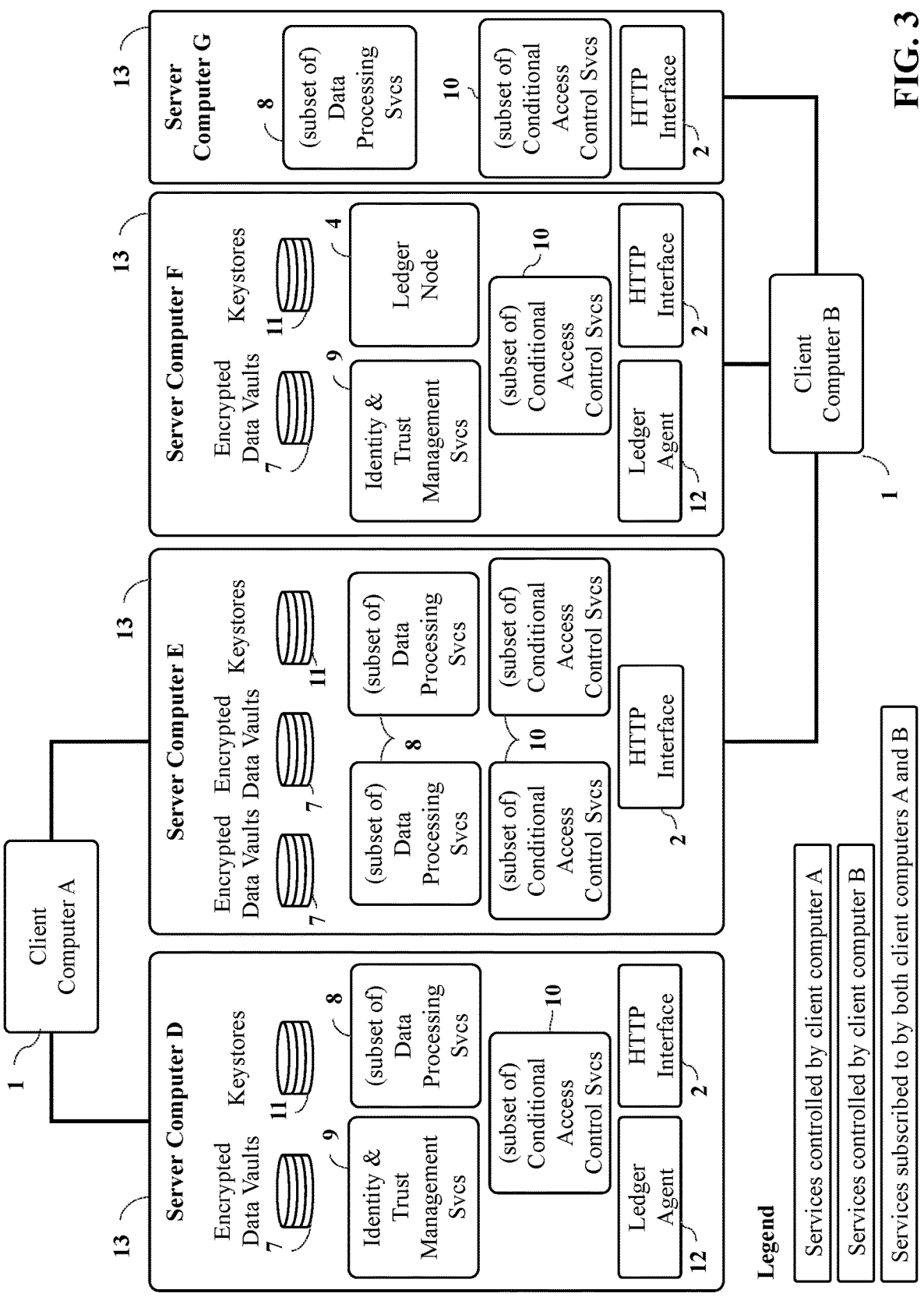
FIG. 3 illustrates decentralization of control and distribution in the physical/network topology of FIG. 1.

FIG. 3 illustrates an example embodiment of the decentralized database system from the perspective of physical and/or network topology. In addition to being under decentralized control, the decentralized database system may also be distributed across multiple server computers 13 and/or computer networks. The server computers 13 may exist in different data centers or different geographic locations, managed under different configurations (e.g., access rules, firewalls, etc.) on different computer networks or VPNs, and/or may be self-operated or operated by different service providers. This example illustrates a simplified case, but in practice, many client computers may subscribe to services (e.g., maintain encrypted data vaults) on a server computer operated by a service provider.

In the example of FIG. 3, the HTTP interfaces 2, ledger node(s) 4, encrypted data vaults 7, data processing services 8, identity & trust management services 9, conditional access-control services 10, keystores 11, ledger agent(s) 12, and other elements of the decentralized database system may be equipped with their own network interfaces and software packaging such that they may be compartmentalized and operated across the various servers in the distributed topology using cloud computing virtualization techniques such as container orchestration. The example depiction of some client-controlled services as operating on the same computer server is not required, and virtualization of these services may allow them to be split into numerous configurations across multiple servers connected by one or more computer networks.

Each encrypted data vault 7 may be further virtualized using distributed database techniques to store underlying data in a distributed manner across multiple physical computer servers and/or storage devices (e.g., database sharding).

In the example of FIG. 3, two client computers (labeled "A" and "B") are controlling and/or subscribing to decentralized database services hosted across multiple server computers. Client Computer A may operate the majority of its client-controlled services on Server Computer D and may also maintain an additional set of encrypted data vaults and a subset of data processing services on Server Computer E. Client Computer B may operate client-controlled services on multiple other server computer(s) F, G, and including operating some client-controlled services on the same shared Server Computer E. Such a configuration may arise if a subset of the data processing services requires specific computer hardware, security configuration, or a specific service provider available on Server Computer E. Each providing/requesting computer may access HTTP interfaces or general network interfaces (including accounts, authentication, session management, API endpoints, etc.) on any of the server computers on which it controls or subscribe to services. Both providing/requesting computers may subscribe to a ledger node operated on Server Computer F.

Figure 4:
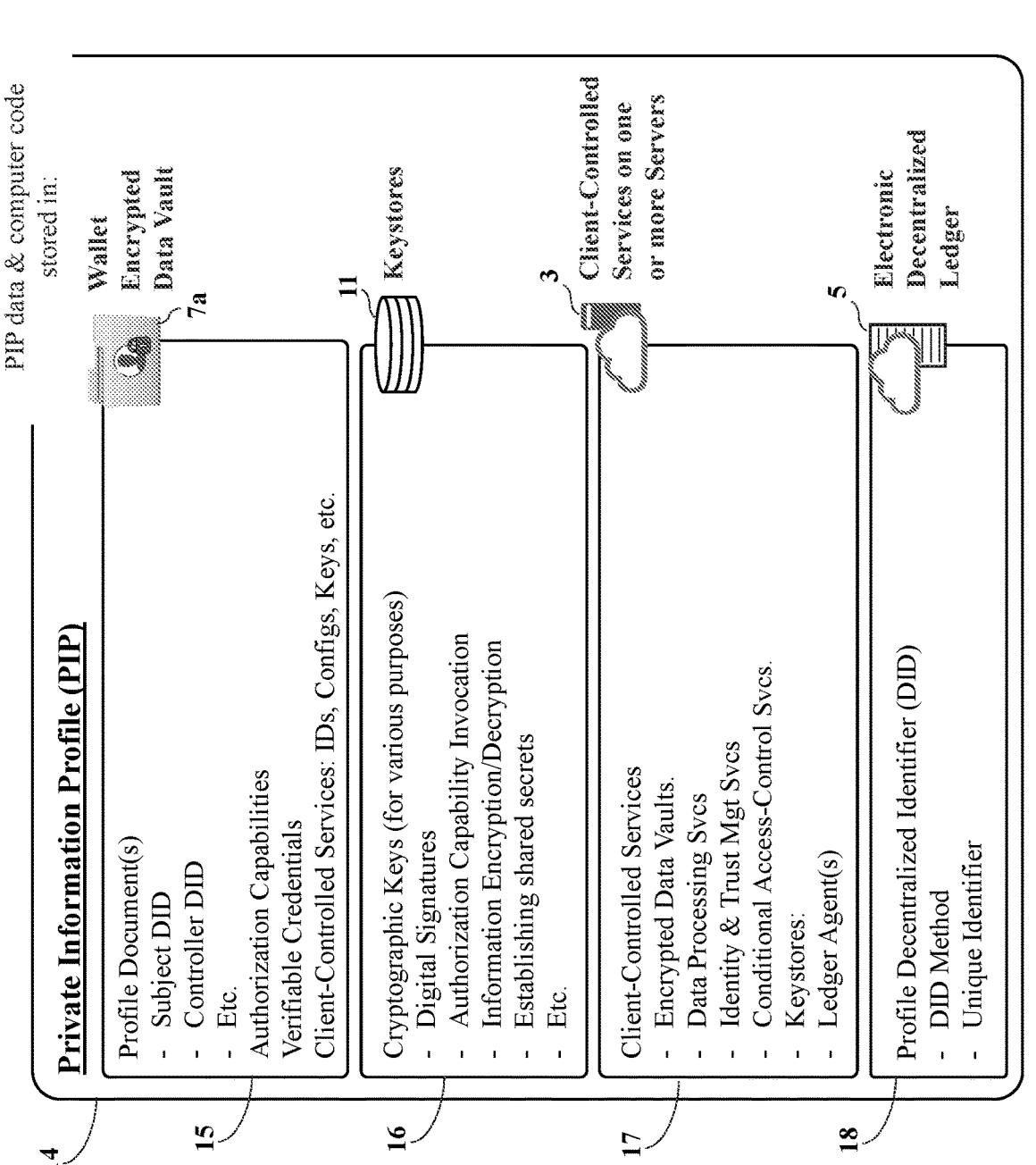
FIG. 4 illustrates a configuration of a private information profile (PIP) used to configure and control various components in FIG. 1.

FIG. 4 illustrates an example private information profile (PIP) 14. A client computer may initiate the creation of one or more PIPs 14 used to control and manage private information pertaining to a subject. Each PIP 14 may include digital objects stored and managed by various services throughout the decentralized database. Profile document(s) 15 may specify the digital identities of the subject and/or controller of the PIP; profile documents 15 may be stored in a specialized encrypted data vault (e.g., wallet data vault 7a) devoted to establishing and maintaining a digital identity of the subject or profile and managing interactions between that digital identity and other client computers or profiles. The wallet data vault 7a may be configured to store and manage access-control objects issued by the client computer or profile or received by the client computer or profile during access-control transactions. The wallet data vault 7a may further store and manage digital objects associated with the instances of client-controlled services associated with the profile (e.g., unique IDs, configuration values, access keys or tokens for the client-controlled services, credit card information, insurance card information, etc.).

Cryptographic keys 16 may be generated and maintained for different purposes (e.g., signing, invoking authorization capabilities, encrypting/decrypting information, establishing shared secrets, etc.) and stored and managed in one or more keystores 11.

The client computer may initiate the provisioning of client-controlled services 3 associated with or controlled by the PIP 14. In this example, these instances of client-controlled services 3 may be authorized by the controlling client computer to perform certain actions on behalf of the PIP 14 or access or modify certain private information controlled by the PIP 14. In this example, these client-controlled services may be described as agents of the PIP 14.

The client computer may further initiate the creation of one or more decentralized identifiers (DIDs) 18 associated with the PIP 14. An example DID 18 may be a specialized type of unique digital identifier, and each DID 18 may specify a unique ID and a computer method for transforming that unique ID into a digital object specifying the digital identity of the PIP 14 and public portions of the cryptographic keys 16 associated with the PIP 14. Each DID 18 may include a representation on the electronic decentralized ledger 5 such that other client computers may discover and access the information encoded in the DID 18 to verify access-control objects or private information presented by the PIP 14.

Figure 5:
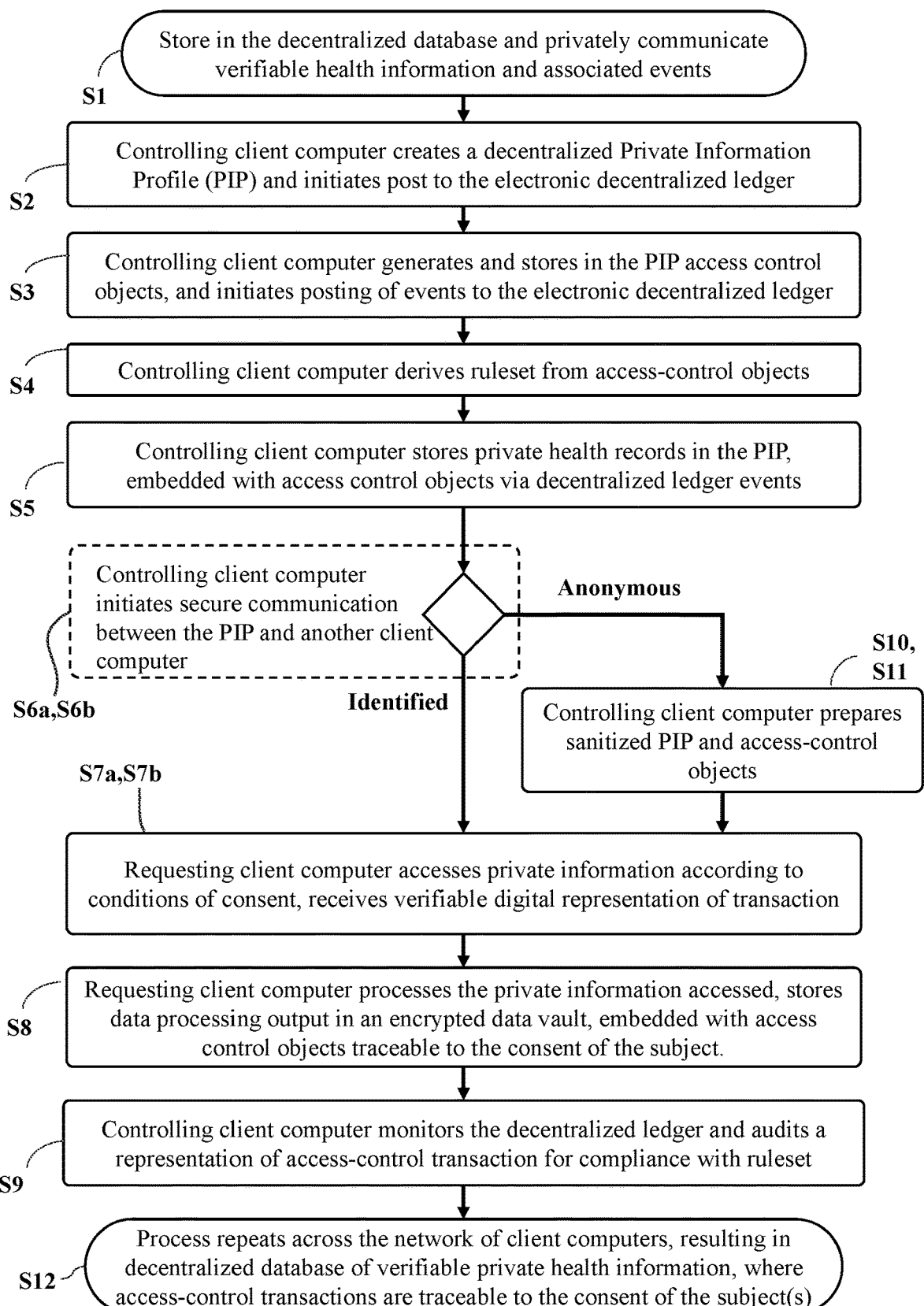
FIG. 5 is a flowchart diagram that illustrates example procedures for storing, requesting, and accessing private information in the decentralized database system of FIG. 1.

Controlling Access to Private Information Traceable to the Consent of the Subject FIG. 5 illustrates an example method in which a controlling client computer and a providing client computer store, request, authorize, access, and process private information pertaining to a subject (as indicated generally in step S1). This example is described in terms of two client computers, for simplicity: a controlling client computer and a requesting client computer. The controlling client computer may or may not be operated by the subject of the private information (in some examples, the client computer may be operated by a family member, nurse, etc. acting on behalf of the subject). In other examples, various steps described may be performed by either, both, or additional client computers.

The controlling computer creates in step S2 a decentralized private information profile (PIP) for storing and managing access to private information of the subject and initiates post of relevant events to the electronic decentralized ledger. In some examples, this PIP may be specifically devoted to one purpose (e.g., storing and managing health information pertaining to the subject), and other PIPs may be created for other purposes. In other examples, the PIP may serve multiple purposes (e.g., healthcare, legal, financial, etc.), and components of the PIP may be duplicated and/or subdivided along the lines of those purposes.

In step S3, the controlling computer generates and stores in the PIP access-control objects associated with the creation or provisioning of the PIP under the consent of the subject. In step S4, the controlling client computer derives a computer ruleset from the access-control objects and stores the ruleset in the PIP. In step S5, the controlling client computer populates the PIP with private health information pertaining to the subject and embeds each health record with access-control objects traceable to the consent of the subject.

In steps S6a-S6b, the controlling client computer initiates private communication between the PIP and another client computer. Multiple example methods are described in the figures, including the controlling computer privately revealing the identity of the subject to the other client computer; or as described in S10 and S11, the controlling client computer initiating an anonymous communication with other client computers.

In steps S7a-S7b, the requesting client computer (with which the private communication was initiated) requests access, exchanges with the controlling client computer access-control objects, accesses private information according to the conditions of consent, and receives a verifiable digital representation of the access-control transaction. In step S8, the requesting client computer processes the private information accessed and stores the output of the data processing in an encrypted data vault, embedded with access-control objects traceable to the private information and consent of the subject to access and process that private information. In Step S9, the controlling client computer monitors the decentralized ledger for events associated with the private information and audits the digital representation of the access-control transaction for compliance with the ruleset.

These steps S2-S9 may be repeated or extended across the network of client computers, resulting in a decentralized method of controlling access to private information traceable to the consent of the subject, as indicated in step S12.

Establishing Consent

Figure 6:
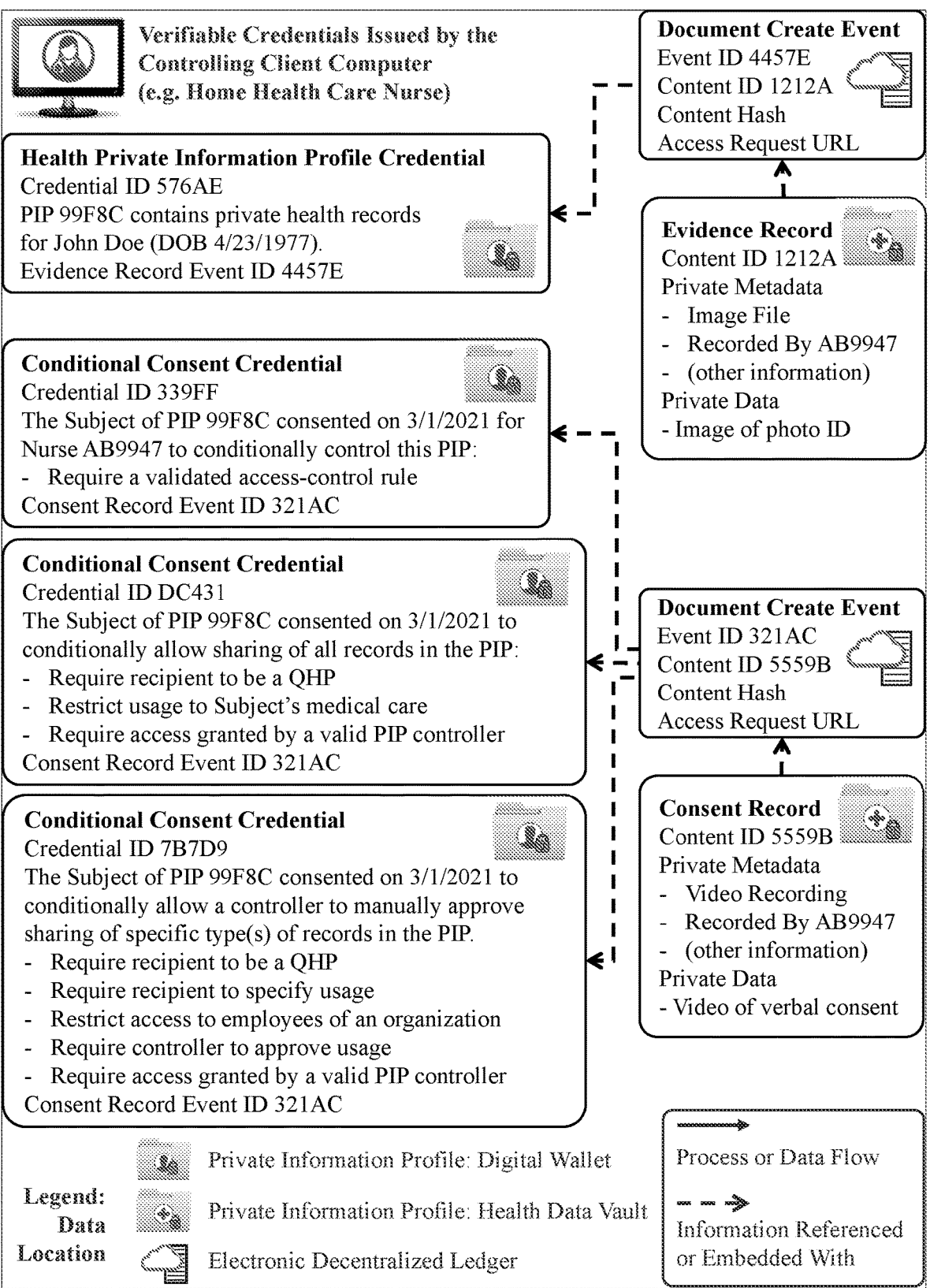
FIG. 6 illustrates example access-control objects generated and embedded with the private information profile as described in step S3 of FIG. 5.

FIG. 6 illustrates example access-control objects generated and/or embedded during step S3. Example access-control objects include digital evidence records, stored in encrypted data vaults, document create events stored on the electronic decentralized ledger, and verifiable assertions pertaining to the subject or the user of the controlling client computer. In some example embodiments, these verifiable assertions may be formatted as verifiable digital credentials, having an issuer, a credential subject with claims, and a proof or digital signature of the issuer, such that the digital object is cryptographically verifiable and in verifying the claims are attributable to the issuer. The verifiable credentials may be stored in an encrypted data vault provisioned in the private information profile (e.g., a wallet data vault 7a), and authorization capabilities may be granted such that the controlling client computer and/or other relevant profiles may access the credentials.

An example verifiable credential may specify a method and/or URL for verifying current credential status, and the URL may point to the address of a credential revocation list maintained by the issuing client computer of the credential or by an entity authorized by the issuing client computer to revoke credentials. An issuing client computer may directly revoke a verifiable credential by posting to the revocation list, and in some examples, a client computer may issue additional verifiable credentials clarifying or negating other verifiable credentials. In some example embodiments, a controller of private information (e.g., the subject or another controller) may revoke the evidence embedded with a verifiable credential by deleting or removing it from the location specified in the verifiable credential. An encrypted data vault storing deleted digital evidence may be configured to issue a warning (e.g., verifiable credential) to a client computer attempting to query or access the deleted digital evidence record.

The controlling client computer may collect and store in an encrypted data vault digital evidence relating to the identity of the subject or the purpose of the PIP (e.g., photograph of a driver's license, birth certificate, etc.). The client-controlled services associated with the PIP may further generate a cryptographic hash of the digital evidence record and initiate posting of a document create event to the electronic decentralized ledger containing the hash, a unique ID, and/or a URL to access the digital evidence record. By maintaining a trusted, ordered list of events, the electronic decentralized ledger may serve as proof of existence or integrity of the record.

The controlling client computer may then issue one or more health private information profile credentials asserting that the PIP pertains to a particular subject; asserting the subject's name, date of birth, or other information relating to the purpose of the PIP or identity of the subject. These verifiable credentials may be embedded with the digital evidence by incorporation of a cryptographic hash, unique ID, and/or URL of the ledger event representing the digital evidence. (In some example embodiments, the verifiable credential may incorporate a cryptographic hash, unique ID, and/or URL of the digital evidence record itself).

The controlling client computer may collect and store in an encrypted data vault digital evidence establishing the conditional consent of the subject to create the PIP, for the controlling client computer to control the PIP, and/or for access to private information controlled using PIP. Examples of such consent records include a video or audio recordings of the subject expressing consent, paper documents signed by the subject, electronic documents digitally signed by the subject, digital objects from outside information systems, etc. Similar to the example above, these consent records may be hashed and represented by events on the electronic decentralized ledger.

In some example embodiments, the controlling client computer may issue a set of verifiable digital assertions describing the digital evidence. FIG. 6 illustrates an example embodiment in which multiple conditional consent credentials are issued by the controlling client computer, each conditional consent credential asserting a subset of the facts established in the consent record, and each conditional consent credential including a cryptographic hash, unique ID, and/or URL to the document create event associated with the consent record.

In some other embodiments, similar verifiable digital assertions may be issued by a controlling client computer (including a client computer pertaining to the subject) to express the transfer or delegation of control of the PIP or of certain client-controlled services or private information within the PIP. As in the examples above, such verifiable digital assertions may be in addition to the mechanism for authorizing or executing control and therefore may serve to explain or communicate the associated chain of consent rooted in the consent of the subject.

FIG. 7 illustrates further details of an example set of embedded digital evidence, ledger events, and verifiable digital assertions generated in step S3. Other example embodiments may embed representations (e.g., hash, unique ID, URL) of the verifiable consent credentials in the ledger event or in the consent record itself; or they may embed this information in another digital objects, such as a consent event on the decentralized ledger.

In some example embodiments client-controlled services may be used in combination with a web-based user interface by the controlling client computer to split logical contents of the consent record(s) into a set of atomic conditions of consent. Each condition of consent may be represented in a verifiable credential claim with a format and version listed in the JSON-LD context specified in the verifiable credential. In some example embodiments, this format may represent consent conditions as pre-defined methods in an application programming interface (API). The JSON-LD context may further link to machine-understandable definitions of the conditions of consent, including API documentation or cryptographic hashes, unique IDs, and/or URLs to access computer software to execute those API functions.

Figure 8:
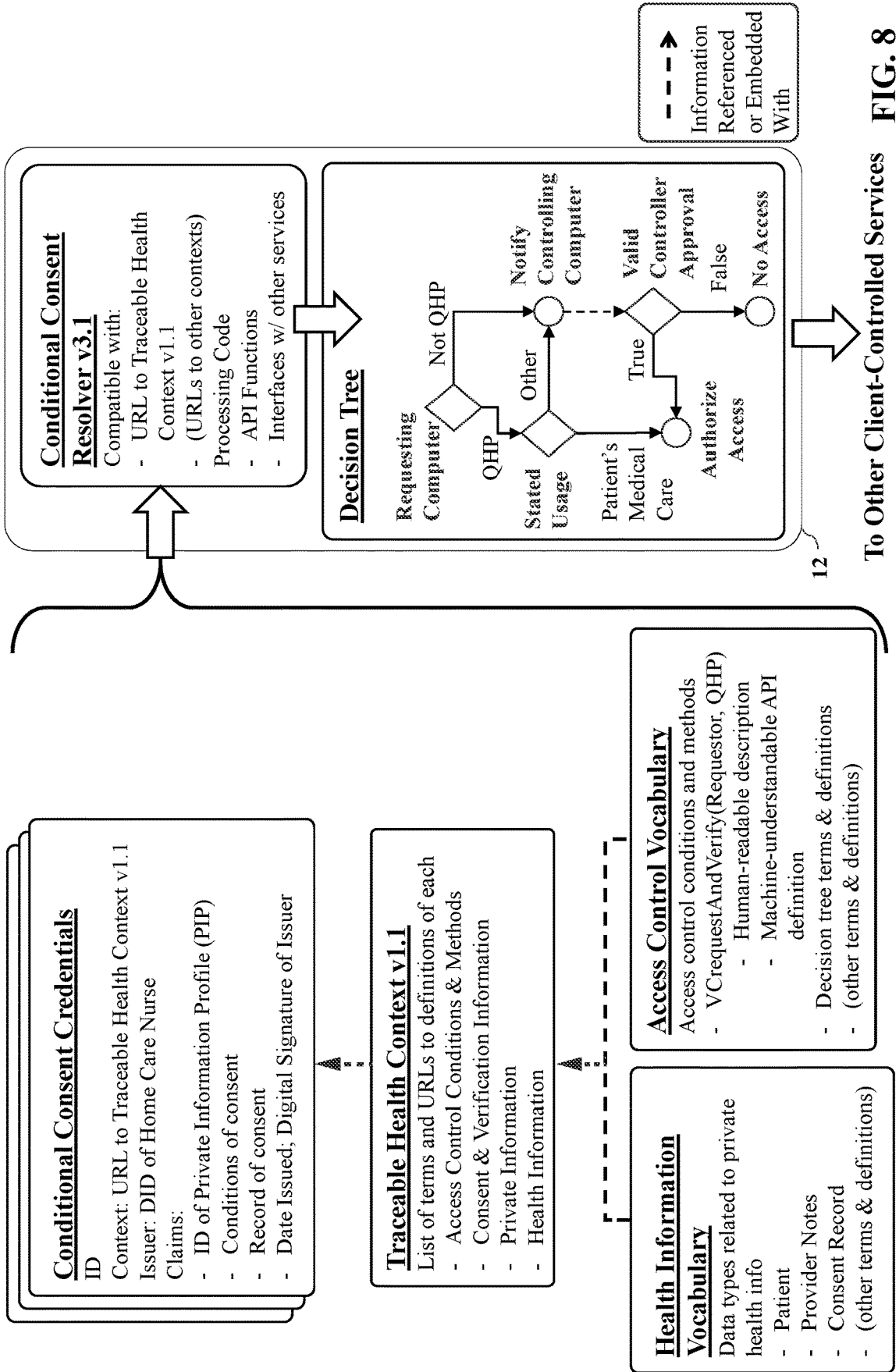
FIG. 8 illustrates an example data flow for generating a traceable ruleset from access-control objects as described in step S4 of FIG. 5.

FIG. 8 illustrates an example data flow for deriving a computer-executable ruleset from verifiable assertions of consent and/or consent conditions, as described in step S4. A set of conditional consent credentials may reference one or more JSON-LD contexts (e.g., a "Traceable Health Context v1.1") available either at a public URL, made accessible by the service provider, stored in a client-controlled service, etc. The traceable health context may contain a list of terms and URLs to access definitions of each term, and these definitions may be stored in one or more vocabularies (again, publicly available, or accessible to the client computer). The traceable health context may specify a range of compatible computer software APIs or a standard to which an API must meet for compatibility, along with compatible versions and URLs to access.

The controlling client computer may initiate the installation or upgrade of client-controlled services to incorporate a software API specified in the traceable health context (e.g., a "Conditional Consent Resolver v3.1). This conditional consent resolver may synthesize information a set of conditional consent credentials, contexts, and vocabularies, to transform the set of verifiable access control conditions into a computer-executable access-control ruleset (e.g., a decision tree). This ruleset may be used to by the conditional access-control services 10 to automatically determine behavior in facilitating an access-control transaction.

Storing Private Information

FIG. 9 illustrates example private information stored in an encrypted data vault and embedded with access-control objects during step S5. A controlling client computer may generate a digital private health record (e.g., via scanning a paper document, uploading a digital document obtained from an external source, or by connecting an encrypted data vault interface to an source of private health data, such as an IoT device interface, medical database, or health information portal) and store the private information in an encrypted data vault devoted to health records pertaining to the subject. In some example embodiments, encrypted data vault interfaces may be configured to accept and store a stream of private health information, such as that provided by a health monitoring device. In some example embodiments, the controlling client computer may update an existing private health record with new information. In some example embodiments, the controlling client computer may issue authorization capabilities to allow a third party (e.g., a doctor or specialist) to store in the encrypted data vault private health information pertaining the subject. In the process of storing the private information, the encrypted data vault service may convert the information to a digital object, including descriptive metadata, a unique ID, cryptographic hash, etc., and encrypt the information with cryptographic keys managed by the PIP.

In some example embodiments, client-controlled services may be configured to initiate posting of an event to the electronic decentralized ledger representing the creation or update of the private health record. By maintaining a trusted, ordered list of events, the electronic decentralized ledger may serve as proof of existence or integrity of a digital object or record, providing a traceable history of the creation and subsequent updates to the record.

An example document create event may include a unique ID, context, the DID and digital signature of the client computer initiating the event submission (in some examples, this may be the DID of the controlling client computer; in other examples it may be a DID controlled by an intermediary transaction service). An example document create event may further anchor the private information by including the unique ID of the private health record, a method and/or URL to lookup or request access to the private health record, and a cryptographic hash of the contents of the private health record.

In some example embodiments, the client computer providing the information may issue, using the identity and trust management services one or more verifiable digital assertions during the creation or update of private health information. FIG. 9 illustrates an example record create credential issued by the controlling client computer and including a verifiable set of claims expressing the unique ID of the PIP, the unique ID of the document create event on the ledger, the purpose for creating the record, and a cryptographic hashes, unique IDs, and/or URLs to the conditional consent credentials describing access control rules for the record.

Each record create credential may provide a verifiable statement of the conditions and/or entities involved in the storing of the private health record, the rationale for why the record was created or updated, and/or a summary of what was changed in the record. Each record create credential may further embed the private health record with a verifiable statement of the consent of the subject and associated access control rules. The example record create credential may be presented to a third party to verify information about the private health record without requiring the third party to access the private information in the health record itself.

Initiating Communication with Other Client Computers

Figure 10:
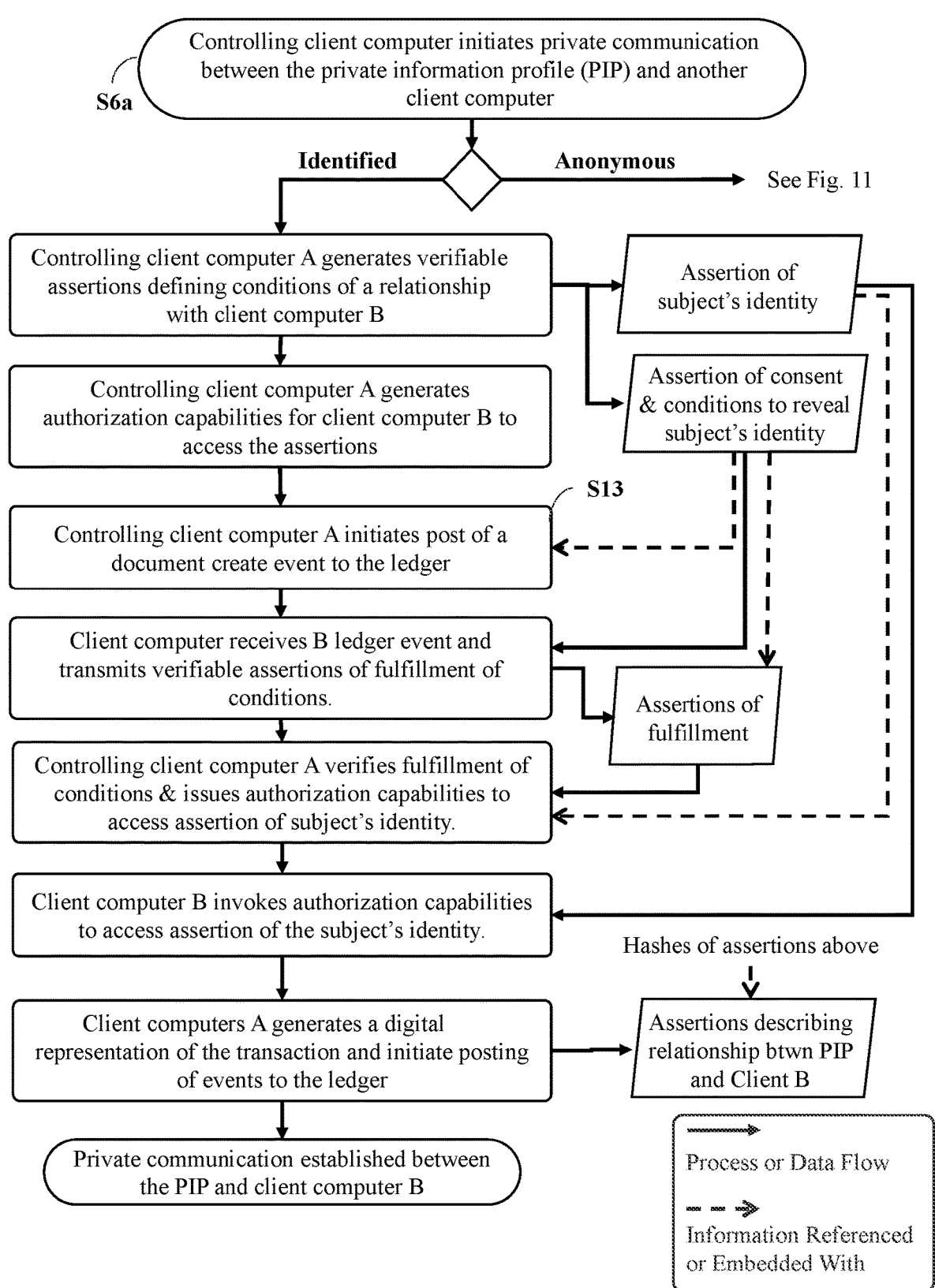
FIG. 10 illustrates an example workflow of step S6*a* of FIG. 5 relating to establishing of a private communication between a private information profile and a client computer.

FIG. 10 illustrates an example method of step S6*a*, in which a controlling client computer A initiates private communication between the PIP and another client computer B, during which the client computer privately reveals the identity of the subject. This method may be used by a controlling client computer initiating an interaction between a subject patient and a healthcare provider, and the method may establish agreement on the conditions of the relationship between the subject and provider. The controlling client computer A may discover the DID of client computer B via public profile information (e.g., a healthcare provider may expose certain information via ledger events linked to publicly-available data to advertise healthcare services provided, etc.).

Controlling client computer A may generate verifiable assertions defining proposed conditions of a relationship with client computer B, including requirements for private communication, secure management of data, compliance with regulatory requirements, healthcare treatments desired, scheduling, etc. Example verifiable assertions may further include verifiable credentials asserting the identity of the subject or verifiable credentials asserting the conditions of consent to reveal the subject's identity. Verifiable assertions may be derived from and/or embedded with existing verifiable assertions of consent associated with the PIP.

In some example embodiments, controlling computer A may store the verifiable assertions in an encrypted data vault and issue and communicate authorization capabilities to client computer B to access those assertions. In some other embodiments, controlling computer A may communicate the assertions directly to client computer B through a receiving endpoint or API defined in the public profile information of client computer B.

In some example embodiments, client computer A may also initiate posting of one or more document create events representing the verifiable assertions to the electronic decentralized ledger. Example document create events may contain authorization capabilities issued to client computer B, and/or information proving the existence or generation of the verifiable assertions.

Client computer B may then receive notification of the verifiable assertions, and in some example embodiments, client computer B may then invoke the authorization capabilities to access the verifiable assertions defining proposed conditions of a relationship. Computer services controlled by client computer B may then interpret the verifiable assertions and respond by transmitting to client computer A another set of verifiable assertions fulfilling or confirming the conditions proposed.

Client computer A may then verify the assertions of fulfillment and upon verification issue authorization capabilities for client computer B to access the assertion of the subject's identity and/or certain private information, such as a medication list or medical history record. Client computer B may then invoke the authorization capabilities and access the assertions and private information from the encrypted data vault controlled by client computer A.

Client computer A may embed representations of the verifiable assertions exchanged in the transaction with an access-control object (e.g., by including cryptographic hashes, unique IDs, and URLs in the access-control object). This access-control object may be formatted as a verifiable digital assertion of the relationship between the PIP and client computer B. Client computer A may post a digital representation of the resulting access-control object to the electronic decentralized ledger and may transmit the access-control object to client computer B. (In some other embodiments, client computer B may generate its own representation of the access-control transaction). Future communication between the PIP and client computer B may follow the rules established in the access-control transaction and future information accessed or transferred may be embedded with the representation of the transaction.

FIG. 11 illustrates an example method of step S6b, in which a controlling client computer A initiates private communication between the PIP and another client computer B, during which the identity of the subject remains anonymous. In addition to protecting the identity of the subject, some example embodiments include methods and apparatus to obscure or protect the unique IDs associated with the PIP so that client computer B is not made aware of information that would correlate the private communication with any other widely-available ("public") activity on the computer network attributable to the unique ID of the PIP. Examples methods to avoid public attribution include obscuring or withholding a DID associated with the PIP, URLs of services controlled by the PIP, etc. This method may be used by a client computer A responding to a public request for sanitized health information as part of a data aggregation or research study. In some examples, client computer B may utilize the decentralized ledger and encrypted data vaults to publish the request for sanitized health information.

An example intermediary transaction service may be a computer processing service operated by a third-party organization or as a client-controlled service. Exemplary implementations include (i) computer code operated by human users via a user interface, or (ii) computer code operating with minimal or no human supervision. Computer code used by the transaction service may be version-controlled, cryptographic hashed, and/or inspected or audited publicly or privately to establish trust in the methods, behaviors, or expected output of the transaction service. In some example embodiments, the output of an audit may be communicated by one or more verifiable digital assertions. The computer code for the transaction service may be made available to users and client-controlled services publicly or through a private interface (e.g., encrypted data vaults), and a digital representation of the transaction service and/or verifiable assertions pertaining to the transaction service may be incorporated into one or more events on the electronic decentralized ledger. Information including API interfaces, procedures, policies, user instructions, input/output data types, etc. may be specified in a JSON-LD context and vocabulary and referenced in one or more digital representations of the transaction service.

A controlling client computer may create a supplementary profile pertaining to the subject and subscribe the supplementary profile to an intermediary transaction service, as described in step S10. Sub-steps of S10 include the controlling client computer A: (i) creating a supplemental profile with new unique IDs and services such that the supplemental profile is not publicly attributable to the PIP, (ii) generating verifiable assertions of consent to create the supplementary profile, (iii) generating verifiable assertions summarizing selected private information controlled by the PIP, sanitized of information identifying the subject, and (iv) generating verifiable assertions subscribing to a transaction service and establishing private communication with the transaction service according to step S6a.

In some example embodiments, the client computer A may embed with the assertions in step S10 the assertions of consent associated with the PIP. Client computer A may store these assertions in an encrypted data vault controlled by the supplementary profile devoted to private information and not to be shared with client computers or services other than the intermediary transaction service.

As described in step S11, an intermediary transaction service may populate the supplementary profile with a new set of sanitized assertions representing the verifiable assertions provided in step S10. Sub-steps of S11 include the intermediary transaction service: (v) verifying the assertions and issuing new assertions summarizing the private information and/or assertions of consent and sanitized of any information identifying client computer A, (vi) storing the sanitized assertions in a portion of the encrypted data vault devoted to shareable information, and (vii) executing a validator function to confirm removal of identifying information from the sanitized assertions and initiating posts to the decentralized ledger representing the sanitized assertions. The intermediary transaction service may issue verifiable credentials asserting the removal of identifying information, methods used, and embedded with evidence of the removal, etc.

Steps S10 and S11 result in a supplementary profile in which neither the attributes of the profile or the private information contained in the shareable encrypted data vault can be attributed to the subject or the controlling client computer A. Example private information includes a set of verifiable assertions issued by the transaction service which communicate relevant facts of the subject's private information, and which may assert sanitized facts about the origin of the information (e.g., it was reported by a qualified healthcare professional, it was collected three months ago, it is supported by digital evidence, etc.).

Initiating Posts of Events to the Decentralized Ledger

Figure 12:
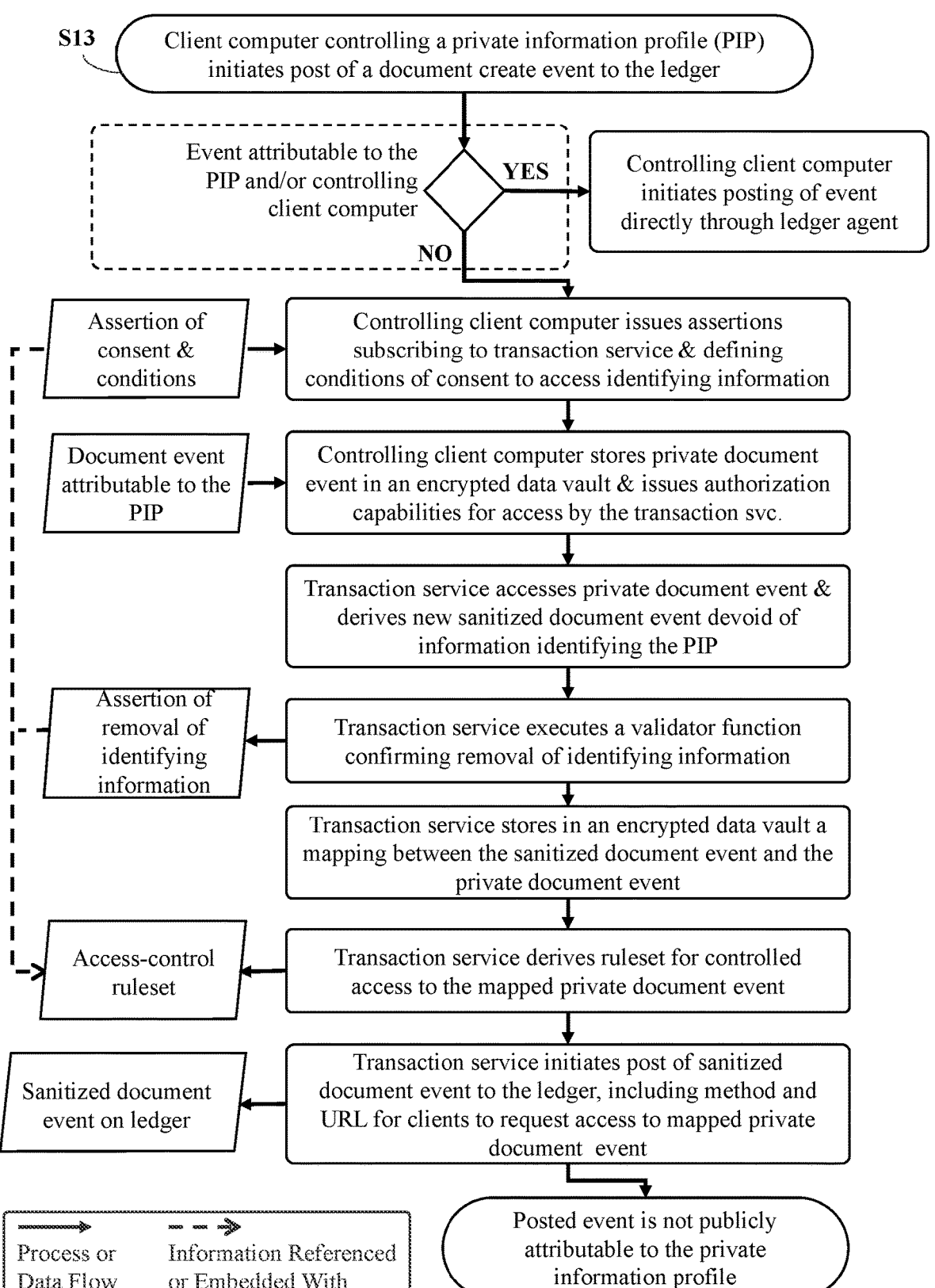
FIG. 12 illustrates an example workflow of step S13 of FIG. 10 relating to initiating posting of an event to an electronic decentralized ledger.

FIG. 12 illustrates an example method of step S13, in which a controlling client computer initiates the posting of an event to the electronic decentralized ledger. In examples where the event is attributable to the PIP and/or the controlling client computer, the controlling client computer forms the digital event object and submits it through the ledger agent service associated with the PIP. In examples where the event is not attributable to the PIP and/or the controlling client computer, an intermediary transaction service is used to submit the event to the ledger. This may or may not coincide with the steps performed in step S6b.

In some examples, the controlling client computer may subscribe to the transaction service by issuing verifiable assertions defining the conditions of consent to subscribe; these may include consent for the transaction service to access identifying information, and they may be embedded with assertions of consent or conditions associated with the PIP. The controlling client computer may then store in an encrypted data vault a private document event (formatted as a ledger event attributable to the PIP), and issue authorization capabilities for the transaction service to access that private document event. The transaction service may then invoke the authorization capabilities, access the private document event, and derive a new sanitized document event devoid of information identifying the PIP or controlling client computer. In some example embodiments, the transaction service may then execute a validator function to confirm the removal of identifying information and communicate the output of that validator by issuing a verifiable digital assertion.

The transaction service may then compute and store in an encrypted data vault a mapping between the sanitized document event and the private document event, which may be used to recover or selectively reveal the original information. In some example embodiments, the transaction service may derive a ruleset for conditional access to the mapped private document event using assertions of consent or conditions provided by the controlling client computer. The transaction service may post to the electronic decentralized ledger the sanitized document event, which may specify a method and URL for clients to request access to the mapped private document event.

Accessing Private Information

Figure 13:
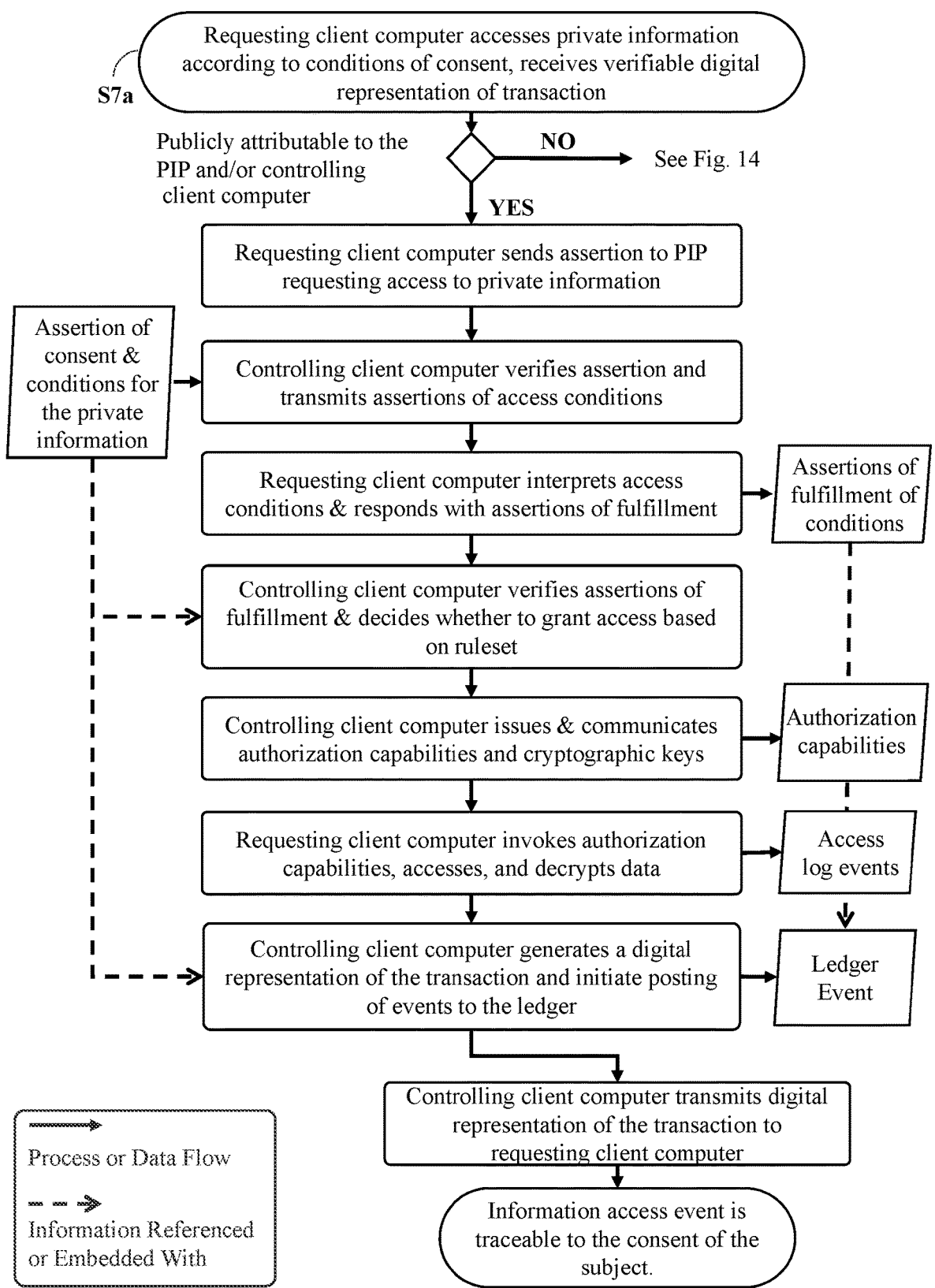
FIG. 13 illustrates an example workflow of step S7*a* of FIG. 5 relating to accessing private information from a private information profile.

FIG. 13 illustrates an example method of step S7*a*, in which a requesting client computer requests access and accesses private information according to the conditions of consent of the subject. Step S7*a* describes an example in which the interaction is publicly attributable to the PIP and/or the controlling client computer. This transaction may follow the establishment of private communication between the PIP and requesting client computer.

The requesting computer may begin by sending a request, in the form of a verifiable digital assertion to the PIP requesting access to private information. The verifiable assertion may describe the specific private information requested, and/or the purpose or conditions associated with access and/or use of the private information. The controlling client computer, receiving the request, may verify the assertion and transmit additional verifiable digital assertions further describing conditions of access. These conditions may be derived from and/or embedded with verifiable assertions of consent associated with the PIP. The requesting client computer, receiving the transmitted conditions, may verify and interpret the assertions and respond with additional assertions representing fulfillment of the conditions. Next, the controlling client computer may verify the assertions of fulfillment and (in some examples utilizing a conditional access-control ruleset) determine whether to grant access to the requested private information. In some examples, this transaction may be repeated in a set of handshakes, with the participating client computers exchanging verifiable digital assertions in sequence.

Next, the controlling client computer may issue and communicate authorization capabilities and cryptographic keys to grant access and the ability to decrypt selected private information to the requesting client computer.

Receiving those authorization capabilities and cryptographic keys, the requesting client computer may then invoke the authorization capabilities, access the private information, and decrypt it. During the access event, the encrypted data vault controlled by the PIP may generate an access log event, including the date and time, DID of the requesting client computer, and unique IDs and hashes of the private information accessed. This access event may be embedded with the chain of verifiable assertions exchanged during the access-control transaction and/or referenced as a representation of the consent of the subject.

In some example embodiments, this access log event may be formatted as a verifiable credential issued by the encrypted data vault service on behalf of the controlling client computer. In some example embodiments, the client controlled services associated with the PIP may further initiate the posting of an event to the electronic decentralized ledger representing the access event. The controlling client computer may then transmit a verifiable digital representation of the access event to the requesting client computer.

Figure 14:
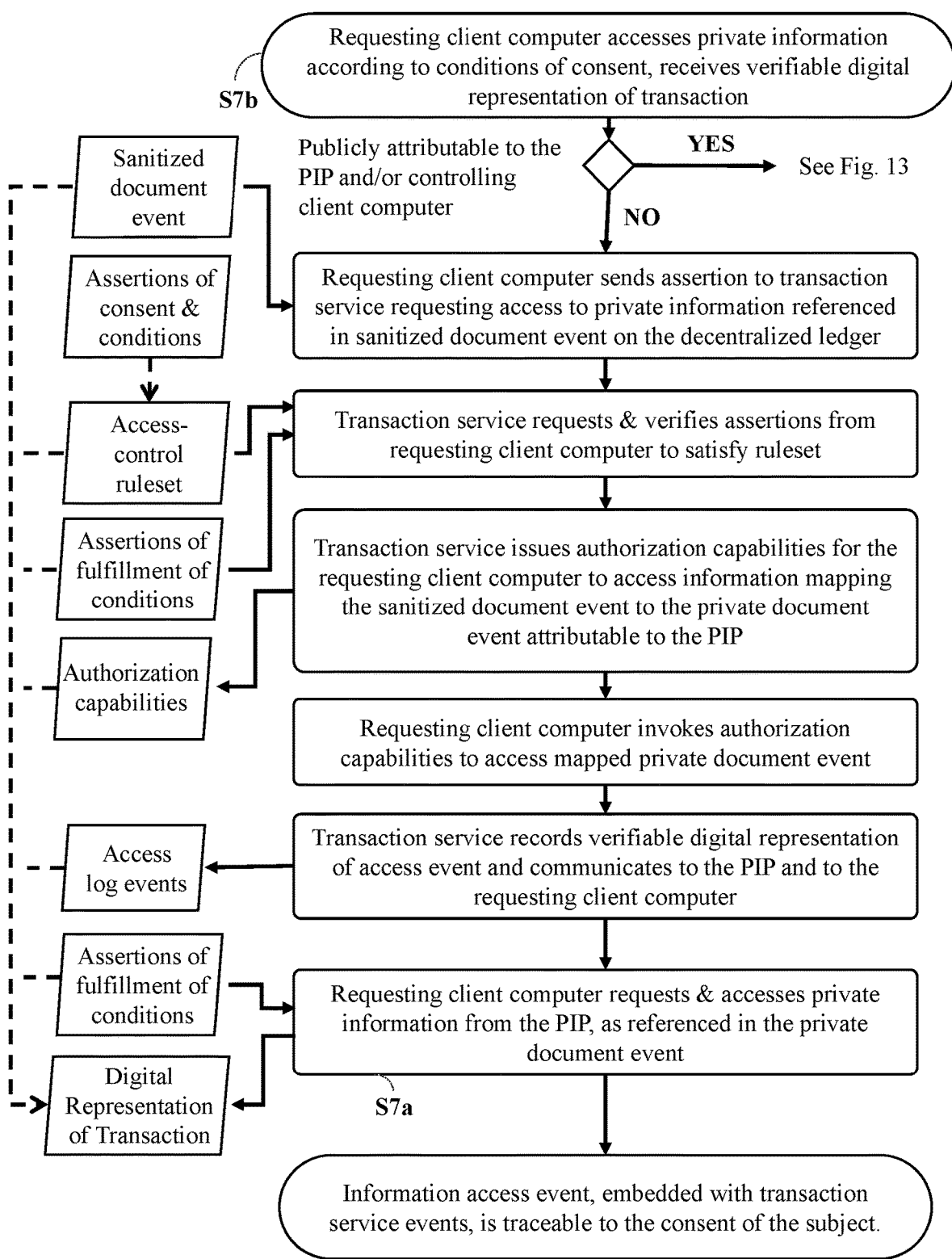
FIG. 14 illustrates an example workflow of step S7*b* of FIG. 5 relating to accessing private information from a private information profile through an intermediary transaction service.

FIG. 14 illustrates an example method of step S7*b*, in which a requesting client computer requests access and accesses private information according to the conditions of consent of the subject, and in which the interaction is not publicly attributable to the PIP or the controlling client computer. This transaction may follow the establishment of anonymous private communication between the PIP and requesting client computer, such as the example in step S6*b*, and the requesting computer may discover the URL and methods to request access to sanitized information following a post to the ledger by an intermediary transaction service, such as the example in step S13.

The requesting client computer may begin by sending a request, in the form of a verifiable digital assertion to the transaction service requesting access to private information referenced in a sanitized document event on the decentralized ledger. The transaction service, according to a derived access-control ruleset, may request and verify assertions from the requesting client computer to satisfy conditions of consent. The transaction service may then issue authorization capabilities for the requesting client computer to access private information in an encrypted data vault mapping the sanitized document event to a private document event attributable to the PIP.

The requesting client computer may then invoke the authorization capabilities to access the mapped private document event. During access, the transaction service may record a verifiable digital representation of the access event and communicate the resulting access log to the PIP and/or the requesting client computer. This access log event may be embedded with verifiable assertions exchanged during the access-control transaction or issued by the controlling client computer when subscribing to the transaction service.

The private document event may contain cryptographic hashes, unique IDs, and URLs attributable to the public-facing DID and unique IDs of client-controlled services associated with the PIP. The requesting client computer may use this information to request and obtain access to private information from the PIP, as in example step S7*a*.

Processing Private Information and Accessing the Data Processing Output

Figure 15:
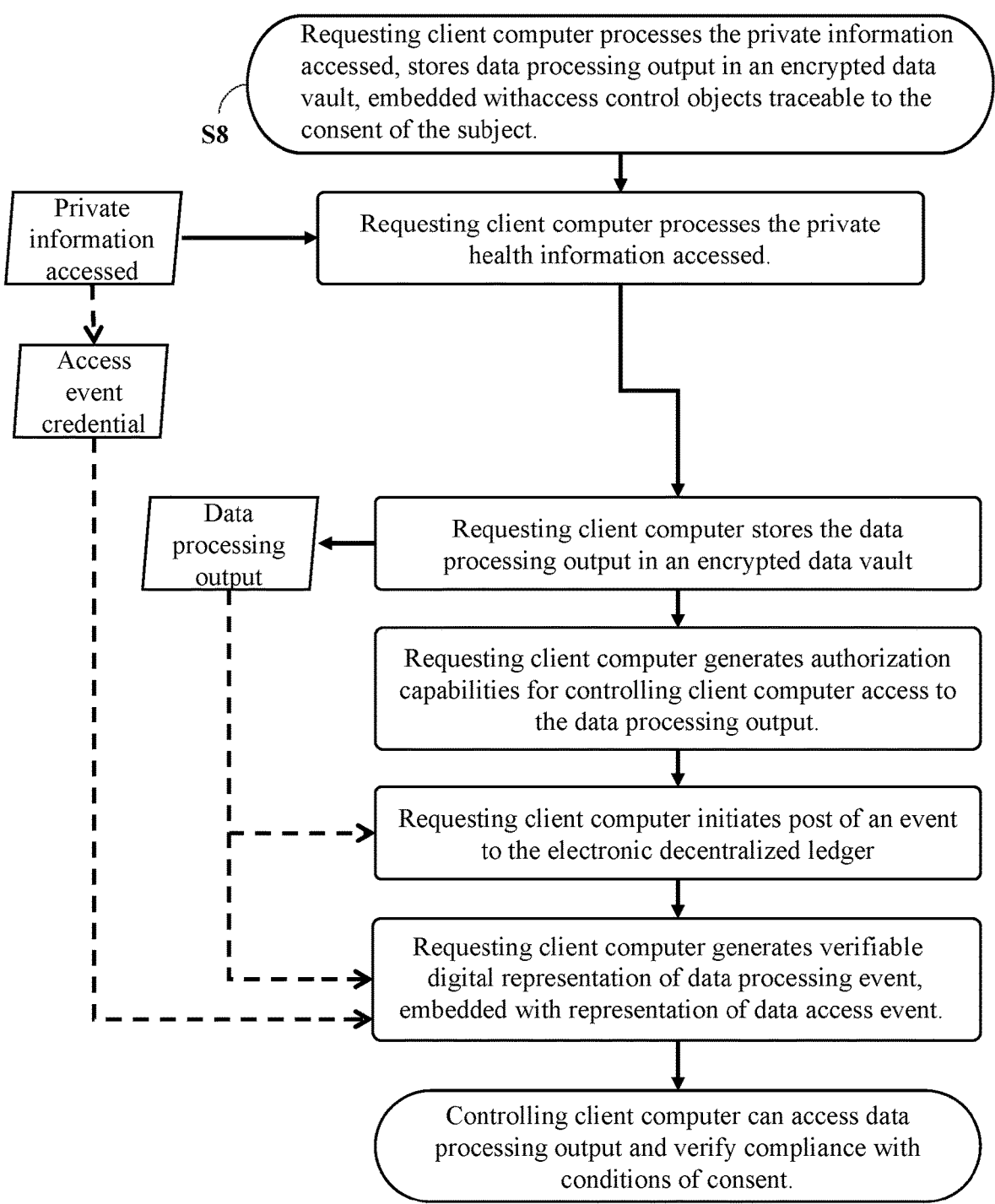
FIG. 15 illustrates an example workflow of step S8 of FIG. 5 relating to processing private information accessed and storing the output of the data processing in an encrypted data vault.

FIG. 15 illustrates an example method of step S8, in which a requesting client computer processes the private information accessed and stores the processing output in an encrypted data vault embedded with access-control objects traceable to the consent of the subject. In some example embodiments, a controlling client computer may interact with the requesting client computer using a supplementary profile not publicly attributable to the PIP. The controlling client computer may issue, revoke, or invoke authorization capabilities on behalf of the supplementary profile and using the DID of the supplementary profile so that actions performed are not publicly attributable to the PIP or the subject of the private information.

First, the requesting client computer executes (e.g., directly or via client-controlled services) one or more data processing actions, including application of numerical or analytical functions, AI models, data visualization techniques, business logic, etc. to the private information accessed alone or in combination with other information (e.g., other aggregated, sanitized private information) The requesting client computer stores the output of the data processing in an encrypted data vault (e.g., controlled by the requesting client computer or the supplementary profile). The requesting client computer may then generate or delegate authorization capabilities for the supplementary profile (or agent thereof) to access the data processing output. The requesting client computer may initiate a post to the decentralized ledger representing the creation of the data processing output. Finally, the requesting client computer may generate one or more verifiable digital representations of the data processing event, embedded with verifiable assertions of consent, access, etc.

The controlling client computer may then access the data processing output by taking control of the supplementary profile and invoking the authorization capabilities. Examples of data processing output include insights, data visualizations, analytical or numerical models, coupons redeemable for goods or services, payment or coupons redeemable for payment, etc. Downstream redemption of coupons or payments outside of the technology may be further obfuscated by the redemption activities of many other subjects having provided private information to the requesting client computer through these methods.

Tracing the Record to the Consent of the Subject

FIG. 16 illustrates the compilation of access-control objects into an example verifiable digital representation of an access-control transaction traceable to the consent of the subject of the private information accessed. It will be appreciated that such a digital representation may be traceable to multiple subjects or may involve multiple elements of private information and/or multiple access-control transactions. Digital objects included in the verifiable digital representation maybe embedded with other digital objects, held privately or publicly, which to the holder may provide a web of inter-related information traceable to the consent of the subject(s).

The example verifiable digital representation in FIG. 16 may be produced by step S9. Example embodiments include a client computer (e.g., the controlling client computer) monitoring the decentralized ledger for events pertaining to information under its control (e.g., publicly attributable or through a transaction service mapping known to the controlling client computer), and then requesting and/or accessing access-control objects through the web of relationships embedded with the event.

Example embodiments also include a client computer (e.g., a controlling or requesting client computer in a transactions involving private information pertaining to a subject) executing an audit of one or more access-control transactions, the verifiable digital representation in FIG. 16 being an example output of such and audit. Example contents of the verifiable digital representation include: (i) assertions pertaining to the controlling client computer, (ii) assertions pertaining to the identity of the subject of the private information, (iii) assertions pertaining to the creation and/or delegation of control of the PIP pertaining to the subject, (iv) assertions pertaining to the requesting client computer, (v) assertions of conditions of consent and/or fulfillment of conditions exchanged during the access-control transaction, (vi) authorization capabilities and/or invocations of authorization capabilities, (vii) assertions pertaining to the creation or update of the private information accessed, (viii) assertions pertaining to the access event, and/or (ix) assertions pertaining to the creation or update of the output of processing the private information accessed. Each access-control object embedded (e.g., the verifiable digital assertions listed above), and the resulting access-control transaction credential may be further embedded with digital evidence, ledger events, or other relevant information.

A client computer involved in an access-control transaction may verify and interpret, at any point during the transaction (e.g., during an auditing step), access-control objects pertaining to the transaction to establish a level of trust in the private information. In some example embodiments, private information may be presented by verifiable assertions of specific facts extracted from digital evidence and sanitized by a transaction service. A client computer may audit verifiable assertions or digital evidence pertaining to the intermediary transaction service to establish its ability to faithfully verify and represent information (e.g., by verifying digital signatures, checking assertion status, verifying cryptographic hashes, confirming methods or computer code specified as evidence in assertions of removal of identifying information, etc.). A client computer may compute or analyze the level of trust in the facts of private information by verifying digital signatures, checking assertion status, verifying cryptographic hashes, and/or interpreting the continents of verifiable assertions summarizing the private information and/or other related verifiable assertions (e.g., who issued the assertion, what are the issuer's qualifications, is there supporting evidence, how much time has passed between the creation of the digital evidence and the issuing of the assertions, etc.).

Technical Advantages and Benefits

There are many technical advantages and applications for the technology described above. Example applications include private health information; as well as legal and/or financial information (e.g., trust and probate, financial planning, investment portfolio management, etc.).

For example, one application involves the coordination of the subject's health care between a mix of decentralized parties (e.g., a home health care agency, skilled nursing facility, healthcare provider network, managed care organization, charitable organization, friends and family, etc.). By anchoring information and events to a decentralized ledger, supported by verifiable digital assertions and private information in a decentralized database system of encrypted data vaults the technology preserves privacy and establishes and communicates among the mix decentralized parties the information needed for tracking and/or reimbursement of services. Decentralized care providing parties may use the technology to securely coordinate activities with each-other (e.g., scheduling doctor's appointments, sharing or transferring medical records, summarizing diagnoses, tracking medication lists, tracking services performed, etc.).

The subject, who may not personally use a computer, may consent to having one or more care providing parties create on a computer on his/her behalf a private information profile, and may consent to the delegation of control of that profile to one or more care providing parties. The creator or controller of the profile may record a video of this consent and embed the digitized video with verifiable credentials asserting the patient's specific conditions of consent (e.g., consent to certain treatment, consent for to delegate control of the profile, consent to share medical records, etc.). By embedding with the private information a traceable record of the subject's consent, any party interacting with the profile can independently verify compliance with regulations and/ or with the subject's wishes, even when the information exchanged is not communicated directly by the subject.

In another example application, the data processing and conditional access-control services may operate on the self-defined metadata to provide translation, synthesis, and/or reconciliation capabilities. The patient may record a consent statement in his/her native language, and these services may produce a range of digital assertions (e.g., verifiable credentials) in one or multiple languages. Standard consent forms (e.g., paper documents) may contain multiple conditions of consent and may differ between provider networks. By converting those forms to individual, machine-understandable verifiable assertions, the technology may provide services to compare, contrast, reuse, or accept specific facts of consent among decentralized parties.

Another example application involves the communication of the subject's private information through a chain of decentralized recipients, for different purposes, following the consent of the subject. For example, the subject may have consented (i) to share health records with qualified health professionals (QHPs) for the purpose of his/her care, and the subject may have also consented (ii) to give a controlling party discretion to share with QHPs for other specific purposes. In example (i) a doctor may exchange access-control objects with the private information profile to obtain access to medical history, and then the doctor may use the access-control objects to delegate the access to a specialist for the purpose of providing care to the subject. In example (ii), the specialist may exchange verifiable digital assertions to request from the profile access to the medical history for the purpose of training new employees, and the technology may notify a controlling party who may in turn authorize access to the specialist for the purpose of training.

In an access-control transaction, the creation and exchange of verifiable digital assertions forms a digital record of who requested, authorized, and accessed the information and for what purpose the information was requested, authorized, and accessed. This is a significant technical advantage over conventional approaches, which lack the capability to establish and embed with the access-control transaction contextual information such as the conditions of the subject's consent or the purpose for which the private information accessed is to be used. The requesting specialist must indicate this purpose via verifiable assertion prior to accessing the private information, and all parties in the access-control transaction may maintain a verifiable digital record that ties that stated purpose directly to the access event. These verifiable records may be chained in successive access and/or data processing events, embedding with the information a verifiable record establishing its ancestry and traceability to the conditions of the subject's consent. The technology's use of verifiable digital assertions (such as verifiable credentials) enables communication and verification of this chain of consent without compromising the privacy of the subject.

The technology also enables a subject to anonymously share verifiable health information, presented as verifiable assertions sanitized of identifying information. Embedded access-control objects allow the requesting party to independently verify that it has followed the consent conditions of one or multiple subjects, and in some applications, that it is not in possession of personally-identifying information pertaining the subjects. Sanitized verifiable assertions may also be used to verify or establish a level of trust in the private information, without attribution to the identity of the subject. Various methods and apparatuses, such as the supplementary profile and transaction service, enable the requesting party to provide feedback, traceable to the access-control transaction, to the anonymous subject.

Description of an Example Computing System

Figure 17:
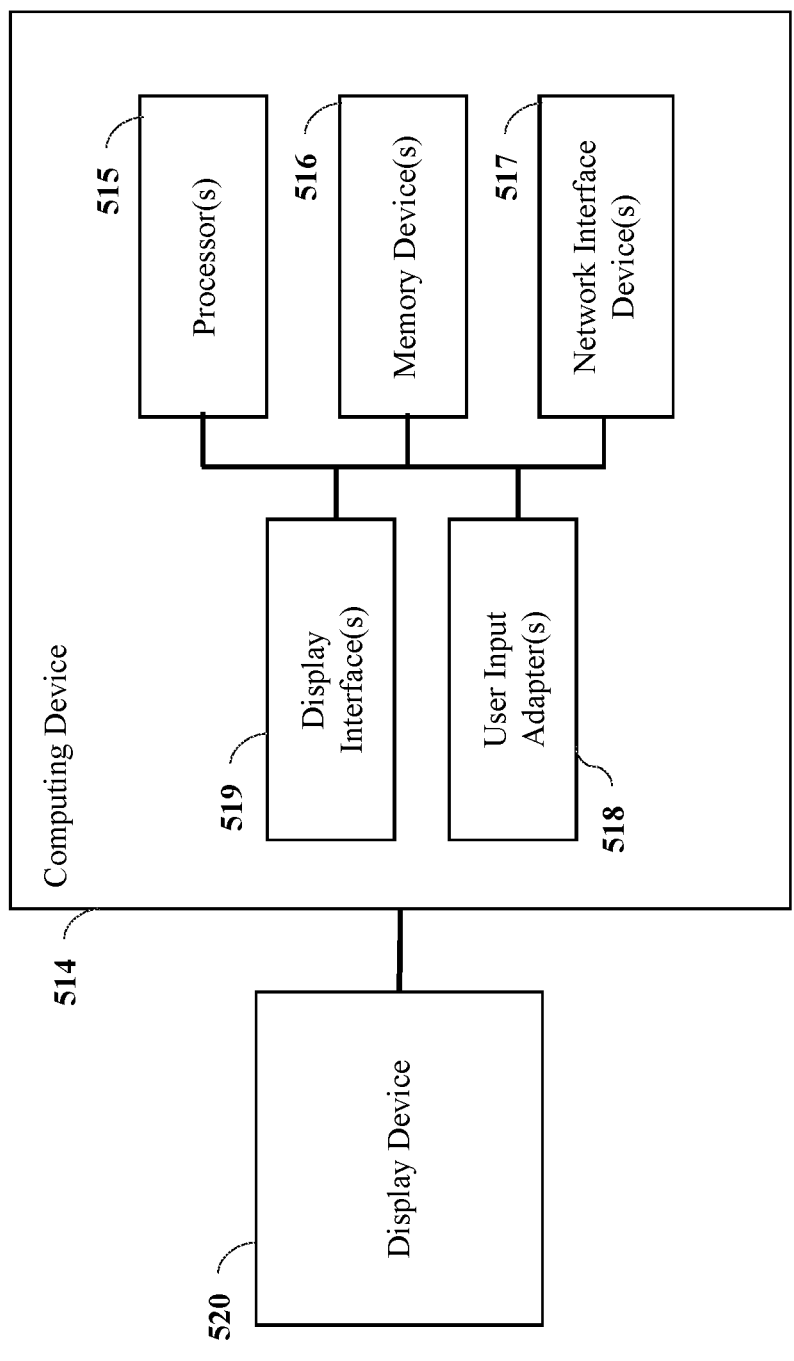
FIG. 17 shows an example computing system that may be used in some example embodiments to implement features described herein.

FIG. 17 shows an example computing system that may be used in some example embodiments to implement computers (e.g., server computers, client computers, mobile computing devices, etc.), services, nodes, interfaces, and features described above. An example computing device 514 (which may also be referred to, for example, as a "computing device," "computer system," or "computing system") includes one or more of the following: one or more hardware processors 515; one or more memory devices 516; one or more network interface devices 517; one or more display interfaces 19; and one or more user input adapters 518. Additionally, in some example embodiments, the computing device 514 is connected to or includes a display device 20. As will explained below, these elements (e.g., the hardware processors 515, memory devices 516, network interface devices 517, display interfaces 19, user input adapters 518, display device 20) are hardware devices (for example, electronic circuits or combinations of circuits) that are configured to perform various different functions for the computing device 514.

In some example embodiments, each or any of the hardware processors 515 is or includes, for example, a single- or multi-core hardware processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some example embodiments, each or any of the processors 515 uses an instruction set architecture such as x86 or Advanced RISC Machine (ARM).

In some example embodiments, each or any of the memory devices 516 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 515). Memory devices 516 are examples of non-volatile computer-readable storage media.

In some example embodiments, each or any of the network interface devices 517 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some example embodiments, the transmitter and receiver of a transceiver may not share any common circuitry and/or may be in the same or separate housings.

In some example embodiments, each or any of the display interfaces 19 is or includes one or more circuits that receive data from the hardware processors 515, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 20, which displays the image data. Alternatively or additionally, in some example embodiments, each or any of the display interfaces 19 is or includes, for example, a video card, video adapter, or graphics processing unit (GPU).

In some example embodiments, each or any of the user input adapters 518 is or includes one or more circuits that receive and process user input data from one or more user input devices (not shown in FIG. 17) that are included in, attached to, or otherwise in communication with the computing device 514, and that output data based on the received input data to the hardware processors 515. Alternatively or additionally, in some example embodiments each or any of the user input adapters 518 is or includes, for example, a PS/2 interface, a USB interface, a touchscreen controller, or the like; and/or the user input adapters 518 facilitates input from user input devices (not shown in FIG. 17) such as, for example, a keyboard, mouse, trackpad, touchscreen, etc.

In some example embodiments, the display device 20 may be a Liquid Crystal Display (LCD) display, Light Emitting Diode (LED) display, or other type of display device. In embodiments where the display device 20 is a component of the computing device 514 (e.g., the computing device and the display device are included in a unified housing), the display device 20 may be a touchscreen display or non-touchscreen display. In embodiments where the display device 20 is connected to the computing device 514 (e.g., is external to the computing device 514 and communicates with the computing device 514 via a wire and/or via wireless communication technology), the display device 20 is, for example, an external monitor, projector, television, display screen, etc.

In various embodiments, the computing device 514 includes one, or two, or three, four, or more of each or any of the above-mentioned elements (e.g., the hardware processors 515, memory devices 516, network interface devices 517, display interfaces 19, and user input adapters 518). Alternatively or additionally, in some example embodiments, the computing device 514 includes one or more of: a processing system that includes the hardware processors 515; a memory or storage system that includes the memory devices 516; and a network interface system that includes the network interface devices 517.

The computing device 514 may be arranged, in various embodiments, in many different ways. As just one example, the computing device 514 may be arranged such that the hardware processors 515 include: a multi (or single)-core hardware processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The hardware processor, the first network interface device, the second network interface device, and the memory devices may be integrated as part of the same SOC (e.g., one integrated circuit chip). As another example, the computing device 514 may be arranged such that: the hardware processors 515 include two, three, four, five, or more multi-core hardware processors; the network interface devices 517 include a first network interface device that implements Ethernet and a second network interface device that implements WiFi and/or Bluetooth; and the memory devices 516 include a RAM and a flash memory or hard disk.

As previously noted, whenever a software module or software process performs an action, operation, or function, the action, operation, or function described above, in actuality it is performed by underlying hardware elements according to the instructions that comprise the software module. Consistent with the foregoing, in various embodiments, for each or any combination of the components of the decentralized database system, the memory devices 516 could load program instructions for the functionality of those components, are implemented using an example of the computing device 514 of FIG. 17. In such embodiments, the following applies for each component: (a) the elements of the 514 computing device 514 shown in FIG. 17 (i.e., the one or more hardware processors 515, one or more memory devices 516, one or more network interface devices 517, one or more display interfaces 19, and one or more user input adapters 518), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some example embodiments, such software modules (as well as any data described herein as handled and/or used by the software modules) are stored in the memory devices 516 (e.g., in various embodiments, in a volatile memory device such as a RAM or an instruction register and/or in a non-volatile memory device such as a flash memory or hard disk) and all actions described herein as performed by the software modules are performed by the processors 515 in conjunction with, as appropriate, the other elements in and/or connected to the computing device 514 (i.e., the network interface devices 517, display interfaces 19, user input adapters 518, and/or display device 20); (c) alternatively or additionally, to the extent it is described herein that the component processes and/or otherwise handles data, in some example embodiments, such data is stored in the memory devices 516 (e.g., in some example embodiments, in a volatile memory device such as a RAM and/or in a non-volatile memory device such as a flash memory or hard disk) and/or is processed/handled by the processors 515 in conjunction, as appropriate, the other elements in and/or connected to the computing device 514 (i.e., the network interface devices 517, display interfaces 19, user input adapters 518, and/or display device 20); (d) alternatively or additionally, in some example embodiments, the memory devices 515 store instructions that, when executed by the processors 515, cause the processors 515 to perform, in conjunction with, as appropriate, the other elements in and/or connected to the computing device 514 (i.e., the memory devices 516, network interface devices 517, display interfaces 19, user input adapters 518, and/or display device 20), each or any combination of actions described herein as performed by the component and/or by any software modules described herein as included within the component.

The hardware configurations shown in FIG. 17 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 17, (e) via other hardware arrangements, architectures, and configurations, and/or via combinations of the technology described in (a) through (e).

Selected Terminology

The elements described in this document include actions, features, components, items, attributes, and other terms. Whenever it is described in this document that a given element is present in "some embodiments," "various embodiments," "certain embodiments," "certain example embodiments, "some example embodiments," "an exemplary embodiment," "an example," "an instance," "an example instance," or whenever any other similar language is used, it should be understood that the given element is present in at least one embodiment, though is not necessarily present in all embodiments.

Consistent with the foregoing, whenever it is described in this document that an action "may," "can," or "could" be performed, that a feature, element, or component "may," "can," or "could" be included in or is applicable to a given context, that a given element "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed elements (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed elements but do not preclude the presence or addition of one or more other elements; and if an element is described as "optional," such description should not be understood to indicate that other elements are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

The claims are not intended to invoke means-plus-function construction/interpretation unless they expressly use the phrase "means for" or "step for." Claim elements intended to be construed/interpreted as means-plus-function language, if any, will expressly manifest that intention by reciting the phrase "means for" or "step for"; the foregoing applies to claim elements in all types of claims (method claims, apparatus claims, or claims of other types) and, for the avoidance of doubt, also applies to claim elements that are nested within method claims. Consistent with the preceding sentence, no claim element (in any claim of any type) should be construed/interpreted using means plus function unless the claim element is expressly recited using the phrase "means for" or "step for."

Whenever it is stated herein that a hardware element (e.g., a processor, a network interface, a display interface, a user input adapter, a memory device, or other hardware element), or combination of hardware elements, is "configured to" perform some action, it should be understood that such language specifies a physical state of configuration of the hardware element(s) and not mere intended use or capability of the hardware element(s). The physical state of configuration of the hardware elements(s) fundamentally ties the action(s) recited following the "configured to" phrase to the physical characteristics of the hardware element(s) recited before the "configured to" phrase. In some embodiments, the physical state of configuration of the hardware elements may be realized as an application specific integrated circuit (ASIC) that includes one or more electronic circuits arranged to perform the action, or a field programmable gate array (FPGA) that includes programmable electronic logic circuits that are arranged in series or parallel to perform the action. In some embodiments, the physical state of configuration of the hardware element may be specified through storing (e.g., in a memory device) program code (e.g., firmware, software, etc.) that, when executed by a hardware processor, causes the hardware elements (e.g., by configuration of registers, memory, etc.) to perform the actions in accordance with the program code.

A hardware element (or elements) can be therefore be understood to be configured to perform an action even when the specified hardware element(s) is/are not currently performing the action or is not operational (e.g., is not on, powered, being used, or the like). Consistent with the preceding, the phrase "configured to" in claims should not be construed/interpreted, in any claim type (method claims, apparatus claims, or claims of other types), as being a means plus function; this includes claim elements (such as hardware elements) that are nested in method claims.

Although process steps, algorithms or the like, including without limitation with reference to FIGS. 1-17, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. Apparatus for conditionally controlling access, across a computer network by decentralized client computers, to private information pertaining to a subject stored in a decentralized database, comprising:

a client computer processor;

memory to store instructions that, when executed or initiated by the client computer processor, cause the client computer processor to facilitate an access-control transaction, by:

embedding with the private information one or more independently-verifiable digital assertions expressing specific conditions of consent of the subject pertaining to access and/or use of the private information, wherein each independently-verifiable digital assertion:

(i) is an independent statement asserting a specific condition or set of conditions of consent pertaining to a set or type of private information, (ii) is individually digitally signed by an issuer asserting the statement of consent, (iii) incorporates information identifying the issuer asserting the statement of consent, and (iv) is separate from computer code implementing access control rules pertaining to the private information;

receiving requests for private information and in response to the requests, determining, from the one or more independently-verifiable digital assertions expressing specific conditions of consent, whether to authorize access to the private information;

issuing, in response to a determination to authorize access, one or more independently-verifiable digital assertions of authorization to access the private information, wherein each independently-verifiable digital assertion of authorization to access:

(i) is an independent statement granting authorization for a specific party to access specific private information, (ii) is individually digitally signed by an issuer controlling access to the private information, where the issuer asserting the statement of consent and the issuer controlling access to the private information may the same or different, (iii) incorporates information identifying the issuer controlling access to the private information and the specific party being granted the authorization to access the private information, and (iv) is separate from computer code implementing access control rules pertaining to the private information; and embedding the independently-verifiable assertions expressing specific conditions of consent with the independently-verifiable digital assertions of authorization to access, resulting in a digital representation of the access-control transaction that is traceable to the consent of the subject.

2. The apparatus in claim 1, wherein the client computer processor and/or the memory include a single computer hardware device or multiple computer hardware devices distributed across the computer network, and wherein when the client computer processor and/or the memory include multiple computer hardware devices distributed across the computer network, the instructions are executed by a combination of computer processing services distributed across the multiple computer hardware devices.

3. The apparatus in claim 1, wherein the decentralized database includes independently-controlled encrypted data vaults, and where a portion of the decentralized database allocated to the private information includes one or more of the encrypted data vaults controlled by the client computer processor;

each encrypted data vault having computer processing circuitry:

to receive, evaluate, and/or respond to requests for information;

to encrypt, store in encrypted format, and/or decrypt the private information using cryptographic keys controlled by the client computer processor;

to embed with the private information independently-verifiable digital assertions expressing specific conditions of consent and/or authorization to access the private information; and to independently verify assertions of authorization to access private information made by requesting client computers, where the authorization is traceable to the controlling client computer processor through a digital chain of delegation.

4. The apparatus in claim 3, wherein each encrypted data vault includes computer processing circuitry to embed with the private information one or more independently-verifiable digital assertions used in the determining of whether to authorize access to the private information, and/or the authorizing of access to the private information; and wherein the independently-verifiable digital assertions used in the determining and/or authorizing embedded with the private information form a digital representation of the access-control transaction.

5. The apparatus in claim 1, wherein the client computer processor is configured to:

derive from digital evidence of consent of the subject, a set of independently-verifiable digital assertions expressing specific conditions of consent of the subject pertaining to access and/or use of the private information; and embed with each assertion a cryptographic hash, unique digital identifier, and/or uniform resource locator of the digital evidence.

6. The apparatus in claim 5, wherein:

each independently-verifiable digital assertion expressing specific conditions of consent in the set represents an atomic condition or logical statements in the digital evidence;

each verifiable digital assertion is embedded with the cryptographic hashes, unique digital identifiers, and/or uniform resource locators of other verifiable digital assertions in the set; and the set of verifiable digital assertions comprises a representation of a combination of the conditions of consent or the logical statements of consent expressed in the digital evidence.

7. The apparatus in claim 6, wherein the client computer processor is configured to derive from the set of independently-verifiable digital assertions expressing specific conditions of consent a set of access control rules containing computer instructions to determine the conditions under which to authorize access to the private information.

8. The apparatus in claim 1, wherein the independently-verifiable digital assertions and/or the private information are embedded with event objects on an electronic decentralized ledger, each event object containing an independently-verifiable digital representation of the independently-verifiable digital assertions and/or the private information, and recorded events forming a persistent digital representation of the access-control transaction that is traceable to the consent of the subject.

9. The apparatus in claim 1, wherein the private information is controllable using a private information profile pertaining to the subject, and where the private information profile includes:

unique digital identifiers pertaining to the subject and/or the private information profile;

cryptographic keys and/or computer processing instructions for digitally signing, verifying, encrypting, decrypting, and/or asserting information;

client-controlled services for data processing, identity and trust management, conditional access control, encrypted data storage, cryptographic key management, and/or communication with an electronic decentralized ledger; and embedded with the private information profile, one or more independently-verifiable assertions expressing consent of the subject to create and/or operate the private information profile.

10. The apparatus in claim 9, wherein the private information profile contains:

digital identifiers not publicly attributable to the subject or the private information profile;

cryptographic keys and/or computer processing instructions not publicly attributable to the subject or the private information profile;

client controlled services not publicly attributable to the subject or the private information profile; and independently-verifiable digital assertions expressing consent and/or authorization pertaining to creation and/or control of the private information profile, wherein the independently-verifiable digital assertions are sanitized of information attributable to the subject's identity and represent consent of the subject and/or an origin or veracity of the private information.

11. The apparatus in claim 10, wherein the private information profile contains independently-verifiable digital assertions expressing specific facts of the private information; and wherein the independently-verifiable digital assertions expressing specific facts do not include information pertaining to an identity of the subject; and wherein the independently-verifiable digital assertions expressing specific facts are embedded with independently-verifiable digital assertions expressing consent of the subject and/or the origin or veracity of the private information.

12. The apparatus in claim 10, wherein the client-controlled services are configured to initiate posting of events to the electronic decentralized ledger through an intermediate transaction service, and wherein the intermediate transaction service is configured to:

sanitize posted events by replacing digital identifiers, uniform resource locators, and other event data with new data not publicly attributable to the subject or the private information profile;

embed with the event the independently-verifiable digital assertions expressing consent of the subject to subscribe to the transaction service;

initiate posting of sanitized events to the electronic decentralized ledger; and record and store a mapping of sanitized event data to the original event data.

13. The apparatus in claim 1, wherein the independently-verifiable digital assertions expressing specific conditions of consent include an expression of consent by the subject to reveal an identity of the subject and to establish a secure relationship with another client computer through which the private information is generated, stored, and/or accessed.

14. Apparatus for requesting access across a computer network by one or more decentralized client computers to private information pertaining to a subject, stored in a decentralized database, comprising:

a requesting client computer processor;

memory to store instructions that, when executed or initiated by the client computer processor, cause the requesting client computer processor to facilitate an access-control transaction, including:

requesting access to the private information controlled by one of the client computers on the computer network;

receiving one or more independently-verifiable digital assertions expressing specific conditions of consent by the subject pertaining to access and/or use of the private information, wherein each independently-verifiable digital assertion expressing specific conditions of consent:

(i) is an independent statement asserting one or more specific conditions of consent of the subject pertaining to a set or type of private information, (ii) is individually digitally signed by an issuer asserting the conditions of consent, (iii) incorporates information identifying the issuer asserting the conditions of consent, and (iv) is embedded with the cryptographic hashes, unique digital identifiers, and/or uniform resource locators of the private information;

in response, transmitting one or more independently-verifiable digital assertions of fulfillment of the conditions of consent by the requesting client computer processor, wherein each independently-verifiable digital assertion of fulfillment of the conditions of consent:

(i) is an independent statement asserting that the requesting client computer has fulfilled one or more specific conditions of consent of the subject pertaining to a set or type of private information, (ii) is individually digitally signed by an issuer asserting fulfillment of the conditions of content consent, where the issuer asserting fulfillment of the conditions of consent and the issuer asserting the conditions of consent are the same or different, and (iii) incorporates information identifying the issuer asserting fulfillment the conditions of consent;

receiving and invoking one or more independently-verifiable digital assertions of authorization to access the private information, wherein each independently-verifiable digital assertion of authorization to access the private information:

(i) is an independent statement granting authorization for a specific party to access specific private information, (ii) is individually digitally signed by an issuer controlling access to the private information, where the issuer asserting the conditions of consent, the issuer asserting fulfillment of the conditions of consent, and the issuer controlling access to the private information are the same or different, (iii) incorporates information identifying the issuer controlling access to the private information and the specific party being granted the authorization to access the private information, and (iv) is separate from computer code implementing access control rules pertaining to the private information; and receiving the one or more independently-verifiable digital assertions (a) expressing specific conditions of consent by the subject, (b) of fulfillment of the conditions of consent, or (c) of authorization to access the private information, embedded with the private information, representing a record of the access control transaction traceable to the consent of the subject.

15. The apparatus in claim 14, wherein the client computer processor and/or the memory include a single computer hardware device or multiple computer hardware devices distributed across the computer network, and wherein when the client computer processor and/or the memory include multiple computer hardware devices distributed across the computer network, the instructions are executed by a combination of computer processing services distributed across the multiple computer hardware devices.

16. The apparatus in claim 14, wherein the requesting client computer processor is configured to verify authenticity and/or completeness of the independently-verifiable digital assertions expressing specific conditions of consent embedded with the private information to determine compliance with consent conditions of the subject.

17. The apparatus in claim 14, wherein the requesting client computer processor is configured to determine from the independently-verifiable digital assertions expressing specific conditions of consent embedded with the private information of the subject a level of trust in authenticity and/or origin of the private information of the subject.

18. The apparatus in claim 14, wherein the requesting client computer processor is configured to request access to digital evidence embedded with the independently-verifiable digital assertions expressing specific conditions of consent, access the digital evidence, and display or process the digital evidence to further verify assertions included in the independently-verifiable digital assertions expressing specific conditions of consent.

19. The apparatus in claim 14, wherein the requesting client computer processor is configured to analyze the one or more independently-verifiable digital assertions (a), (b), or (c) embedded with the private information of the subject to verify and/or prove that neither the private information of the subject nor the one or more independently-verifiable digital assertions (a), (b), or (c), embedded with the private information of the subject contain identifying information of the subject.

20. The apparatus in claim 14, wherein the requesting client computer processor is configured to aggregate operations performed during one or more access-control transactions into a verifiable digital audit report of compliance with the specific conditions of consent of the subject embedded with the private information of the subject.

21. The apparatus in claim 14, wherein the requesting client computer processor is configured to perform data processing operations on the private information accessed and store a digital output of the data processing operations in an encrypted data vault;

where the digital output includes information, reports, numerical or analytical models, and/or digital objects redeemable for goods, services, and/or compensation; and where the output of the data processing operations is embedded with one or more independently-verifiable digital assertions of the origin of the digital output including cryptographic hashes, unique digital identifiers, and/or uniform resource locators of the one or more independently-verifiable digital assertions (a), (b), or (c) embedded with the private information, representing a record of the access control transaction and/or the output of the data processing; and where the one or more independently-verifiable digital assertions of the origin of the digital output form a digital representation of the origin of the output of the data processing operations traceable to the consent of the subject of the private information.

22. The apparatus in claim 21, wherein the one or more independently-verifiable digital assertions of the origin of the digital output include assertions of authorization to access the output of the data processing by the subject of the private information and/or by client computers authorized to act on behalf of the subject, either directly or by delegation of authority to access.

23. A method to facilitate an access-control transaction across a computer network by decentralized client computers to private information pertaining to a subject stored in a decentralized database, comprising:

embedding with the private information one or more independently-verifiable digital assertions expressing consent by the subject pertaining to access and/or use of the private information, wherein each independently-verifiable digital assertion:

(i) is an independent statement asserting a specific condition or set of conditions of consent pertaining to a set or type of private information, (ii) is individually digitally signed by an issuer asserting the statement of consent, (iii) incorporates information identifying the issuer asserting the statement of consent, and (iv) is separate from computer code implementing access control rules pertaining to the private information;

receiving requests for private information and in response to the requests, determining, from the one or more independently-verifiable digital assertions expressing specific conditions of consent, whether to authorize access to the private information;

issuing, in response to a determination to authorize access, one or more independently-verifiable digital assertions of authorization to access the private information, wherein each independently-verifiable digital assertion of authorization to access:

(i) is an independent statement granting authorization for a specific party to access specific private information, (ii) is individually digitally signed by an issuer controlling access to the private information, where the issuer asserting the statement of consent and the issuer controlling access to the private information may the same or different, (iii) incorporates information identifying the issuer controlling access to the private information and the specific party being granted the authorization to access the private information, and (iv) is separate from computer code implementing access control rules pertaining to the private information; and embedding the independently-verifiable assertions expressing specific conditions of consent with the independently-verifiable digital assertions of authorization to access, resulting in a digital representation of the access-control transaction that is traceable to the consent by the subject.

24. A method to facilitate an access-control transaction across a computer network by decentralized client computers to private information pertaining to a subject, stored in a decentralized database, comprising:

requesting access to the private information controlled by one of the client computers on the computer network;

receiving one or more independently-verifiable digital assertions expressing specific conditions of consent by the subject pertaining to access and/or use of the private information, wherein each independently-verifiable digital assertion expressing specific conditions of consent:

(i) is an independent statement asserting one or more specific conditions of consent of the subject pertaining to a set or type of private information, (ii) is individually digitally signed by an issuer asserting the conditions of consent, (iii) incorporates information identifying the issuer asserting the conditions of consent, and (iv) is embedded with the cryptographic hashes, unique digital identifiers, and/or uniform resource locators of the private information;

in response, transmitting one or more independently-verifiable digital assertions of fulfillment of the conditions of consent by the requesting client computer processor, wherein each independently-verifiable digital assertion of fulfillment of the conditions of consent:

(i) is an independent statement asserting that the requesting client computer has fulfilled one or more specific conditions of consent of the subject pertaining to a set or type of private information, (ii) is individually digitally signed by an issuer asserting fulfillment of the conditions of content consent, where the issuer asserting fulfillment of the conditions of consent and the issuer asserting the conditions of consent are the same or different, and (iii) incorporates information identifying the issuer asserting fulfillment the conditions of consent;

receiving and invoking one or more independently-verifiable digital assertions of authorization to access the private information, wherein each independently-verifiable digital assertion of authorization to access the private information:

(i) is an independent statement granting authorization for a specific party to access specific private information, (ii) is individually digitally signed by an issuer controlling access to the private information, where the issuer asserting the conditions of consent, the issuer asserting fulfillment of the conditions of consent, and the issuer controlling access to the private information are the same or different, (iii) incorporates information identifying the issuer controlling access to the private information and the specific party being granted the authorization to access the private information, and (iv) is separate from computer code implementing access control rules pertaining to the private information; and receiving the one or more independently-verifiable digital assertions (a) expressing specific conditions of consent by the subject, (b) of fulfillment of the conditions of consent, or (c) of authorization to access the private information, embedded with the private information, representing a record of the access control transaction traceable to the consent of the subject.

25. A system conditionally controlling access, across a computer network by decentralized client computers, to private information pertaining to a subject stored in a decentralized database, comprising:

a client computer processor;

memory to store instructions that, when executed or initiated by the client computer processor, cause the client computer processor to facilitate an access-control transaction, including:

embedding with the private information one or more independently-verifiable digital assertions expressing specific conditions of consent of the subject pertaining to access and/or use of the private information, wherein each independently-verifiable digital assertion:

(i) is an independent statement asserting a specific condition or set of conditions of consent pertaining to a set or type of private information, (ii) is individually digitally signed by an issuer asserting the statement of consent, (iii) incorporates information identifying the issuer asserting the statement of consent, and (iv) is separate from computer code implementing access control rules pertaining to the private information;

receiving requests for private information and in response to the requests, determining, from the one or more independently-verifiable digital assertions expressing specific conditions of consent, whether to authorize access to the private information;

issuing, in response to a determination to authorize access, one or more independently-verifiable digital assertions of authorization to access the private information, wherein each independently-verifiable digital assertion of authorization to access:

(i) is an independent statement granting authorization for a specific party to access specific private information, (ii) is individually digitally signed by an issuer controlling access to the private information, where the issuer asserting the statement of consent and the issuer controlling access to the private information may the same or different, (iii) incorporates information identifying the issuer controlling access to the private information and the specific party being granted the authorization to access the private information, and (iv) is separate from computer code implementing access control rules pertaining to the private information; and embedding the independently-verifiable assertions expressing specific conditions of consent with the independently-verifiable digital assertions of authorization to access, resulting in a digital representation of the access-control transaction that is traceable to the consent of the subject;

a requesting client computer processor;

memory to store instructions that, when executed or initiated by the client computer processor, cause the requesting client computer processor to facilitate an access-control transaction, including:

requesting access to the private information controlled by one of the client computers on the computer network;

receiving one or more independently-verifiable digital assertions expressing specific conditions of consent by the subject pertaining to access and/or use of the private information, wherein each independently-verifiable digital assertion expressing specific conditions of consent:

(i) is an independent statement asserting one or more specific conditions of consent of the subject pertaining to a set or type of private information, (ii) is individually digitally signed by an issuer asserting the conditions of consent, (iii) incorporates information identifying the issuer asserting the conditions of consent, and (iv) is embedded with the cryptographic hashes, unique digital identifiers, and/or uniform resource locators of the private information;

in response, transmitting one or more independently-verifiable digital assertions of fulfillment of the conditions of consent by the requesting client computer processor, wherein each independently-verifiable digital assertion of fulfillment of the conditions of consent:

(i) is an independent statement asserting that the requesting client computer has fulfilled one or more specific conditions of consent of the subject pertaining to a set or type of private information, (ii) is individually digitally signed by an issuer asserting fulfillment of the conditions of content consent, where the issuer asserting fulfillment of the conditions of consent and the issuer asserting the conditions of consent are the same or different, and (iii) incorporates information identifying the issuer asserting fulfillment the conditions of consent;

receiving and invoking one or more independently-verifiable digital assertions of authorization to access the private information, wherein each independently-verifiable digital assertion of authorization to access the private information:

(i) is an independent statement granting authorization for a specific party to access specific private information, (ii) is individually digitally signed by an issuer controlling access to the private information, where the issuer asserting the conditions of consent, the issuer asserting fulfillment of the conditions of consent, and the issuer controlling access to the private information are the same or different, (iii) incorporates information identifying the issuer controlling access to the private information and the specific party being granted the authorization to access the private information, and (iv) is separate from computer code implementing access control rules pertaining to the private information; and receiving the one or more independently-verifiable digital assertions (a) expressing specific conditions of consent by the subject, (b) of fulfillment of the conditions of consent, or (c) of authorization to access the private information, embedded with the private information, representing a record of the access control transaction traceable to the consent of the subject.

26. A non-transitory, computer-readable storage storing computer-executable information, which when executed or initiated by one or more computers, causes the one or more computers to implement the following operations to facilitate an access-control transaction across a computer network by decentralized client computers to private information pertaining to a subject stored in a decentralized database, comprising:

embedding with the private information one or more independently-verifiable digital assertions expressing specific of consent by the subject pertaining to access and/or use of the private information, wherein each independently-verifiable digital assertion:

(i) is an independent statement asserting a specific condition or set of conditions of consent pertaining to a set or type of private information, (ii) is individually digitally signed by an issuer asserting the statement of consent, (iii) incorporates information identifying the issuer asserting the statement of consent, and (iv) is separate from computer code implementing access control rules pertaining to the private information;

receiving requests for private information and in response to the requests, determining, from the one or more independently-verifiable digital assertions expressing specific conditions of consent, whether to authorize access to the private information;

issuing, in response to a determination to authorize access, one or more independently-verifiable digital assertions of authorization to access the private information, wherein each independently-verifiable digital assertion of authorization to access:

(i) is an independent statement granting authorization for a specific party to access specific private information, (ii) is individually digitally signed by an issuer controlling access to the private information, where the issuer asserting the statement of consent and the issuer controlling access to the private information may the same or different, (iii) incorporates information identifying the issuer controlling access to the private information and the specific party being granted the authorization to access the private information, and (iv) is separate from computer code implementing access control rules pertaining to the private information; and embedding the independently-verifiable assertions expressing specific conditions of consent with the independently-verifiable digital assertions of authorization to access, resulting in a digital representation of the access-control transaction that is traceable to the consent of the subject.

27. A non-transitory, computer-readable storage storing computer-executable information, which when executed or initiated by one or more computers, causes the one or more computers to implement the following operations to facilitate an access-control transaction across a computer network by decentralized client computers to private information pertaining to a subject stored in a decentralized database, comprising:

requesting access to the private information controlled by one of the client computers on the computer network;

receiving one or more independently-verifiable digital assertions expressing specific conditions of consent by the subject pertaining to access and/or use of the private information, wherein each independently-verifiable digital assertion expressing specific conditions of consent:

(i) is an independent statement asserting one or more specific conditions of consent of the subject pertaining to a set or type of private information, (ii) is individually digitally signed by an issuer asserting the conditions of consent, (iii) incorporates information identifying the issuer asserting the conditions of consent, and (iv) is embedded with the cryptographic hashes, unique digital identifiers, and/or uniform resource locators of the private information;

in response, transmitting one or more independently-verifiable digital assertions of fulfillment of the conditions of consent by the requesting client computer processor, wherein each independently-verifiable digital assertion of fulfillment of the conditions of consent:

(i) is an independent statement asserting that the requesting client computer has fulfilled one or more specific conditions of consent of the subject pertaining to a set or type of private information, (ii) is individually digitally signed by an issuer asserting fulfillment of the conditions of content consent, where the issuer asserting fulfillment of the conditions of consent and the issuer asserting the conditions of consent are the same or different, and (iii) incorporates information identifying the issuer asserting fulfillment the conditions of consent;

receiving and invoking one or more independently-verifiable digital assertions of authorization to access the private information, wherein each independently-verifiable digital assertion of authorization to access the private information:

(i) is an independent statement granting authorization for a specific party to access specific private information, (ii) is individually digitally signed by an issuer controlling access to the private information, where the issuer asserting the conditions of consent, the issuer asserting fulfillment of the conditions of consent, and the issuer controlling access to the private information are the same or different, (iii) incorporates information identifying the issuer controlling access to the private information and the specific party being granted the authorization to access the private information, and (iv) is separate from computer code implementing access control rules pertaining to the private information; and receiving the one or more independently-verifiable digital assertions (a) expressing specific conditions of consent by the subject, (b) of fulfillment of the conditions of consent, or (c) of authorization to access the private information, embedded with the private information, representing a record of the access control transaction traceable to the consent of the subject.

* * * * *